United States Patent [19]
Brown et al.

[11] Patent Number: 5,481,730
[45] Date of Patent: Jan. 2, 1996

[54] MONITORING AND CONTROL OF POWER SUPPLY FUNCTIONS USING A MICROCONTROLLER

[75] Inventors: Alan E. Brown; David S. Lin, both of Houston, Tex.

[73] Assignee: Compaq Computer Corp., Houston, Tex.

[21] Appl. No.: 825,399

[22] Filed: Jan. 24, 1992

[51] Int. Cl.⁶ ................................ G06F 1/00; G06F 1/02
[52] U.S. Cl. .................... 395/750; 364/707; 364/DIG. 1; 307/66; 307/52; 128/702
[58] Field of Search ........................ 395/750; 128/702; 307/66, 52; 364/707, 926, 926.9, 948.6, 273.2, 237.8, DIG. 1

[56] References Cited

U.S. PATENT DOCUMENTS

| | | | |
|---|---|---|---|
| 4,128,771 | 12/1978 | Domenico | 307/52 |
| 4,161,027 | 7/1979 | Russell | 395/750 |
| 4,654,821 | 3/1987 | Lapp | 395/750 |
| 4,668,069 | 5/1987 | Hasegawa | 354/428 |
| 4,685,124 | 8/1987 | Smith et al. | 395/750 |
| 4,698,748 | 10/1987 | Juzswik et al. | 395/750 |
| 4,817,049 | 3/1989 | Bates et al. | 395/750 |
| 4,878,196 | 10/1989 | Rose | 395/750 |
| 4,977,899 | 12/1990 | Digby et al. | 128/702 |
| 4,998,215 | 3/1991 | Black et al. | 395/750 |
| 5,019,717 | 5/1991 | McCurry et al. | 307/66 |
| 5,214,785 | 5/1993 | Fairweather | 364/707 |

FOREIGN PATENT DOCUMENTS 0293664  7/1988  European Pat. Off. ............... 395/750

OTHER PUBLICATIONS

Middlebrook, "Input Filter Considerations in Desgin and Application of Switching Regulators," Advances. in Switched–Mode Power Conversion, 1976, pp. 91–107.

Compaq Computer Corporation, "Sch. Pwr Sply. Chopper," released Sep. 1988, pp. 1–2.
Compaq Computer Corporation, "Sch. Primary Contr. Chopper," released Sep. 1988, pp. 1–2.
Compaq Computer Corporation, "Sch. Secondary Contr. Chopper," released Sep. 1988, pp. 1–2.
Compaq Computer Corporation, "Dual Battery Charger Schematic," May 19, 1989, pp. 1–4.

Primary Examiner—George B. Davis
Attorney, Agent, or Firm—Pravel, Hewitt, Kimball & Krieger

[57] ABSTRACT

A power supply monitoring and control circuit using a microcontroller to remotely monitor and control the functions and conditions of a power supply. The power supply monitoring and control circuit is coupled to the primary and secondary sides of a power supply to monitor important voltage and current signals of the power supply, such as the output voltages and currents, and to control the various parameters of the power supply such as the output voltage and current limits. Analog to digital interface circuitry is provided to convert the power supply voltage and current signals to digital signals which are retrieved by a microcontroller which converts the digital signals to numbers representing the values of the power supply signals, and then stores the numbers. The microcontroller is also interfaced to reference and feedback signals of the power supply to control the power supply's operation. The microcontroller further keeps track of the total elapsed time of operation and the total number of times the power supply has been powered up. The power supply monitoring and control circuit operates as a slave to a host computer system so that a system operator can retrieve all of the monitored information and can control the operation of power supply. The host computer system communicates with the power supply monitoring and control circuit through a serial link, so that the host computer can be remotely located. The present invention also provides self-calibration to assure accurate data.

29 Claims, 13 Drawing Sheets

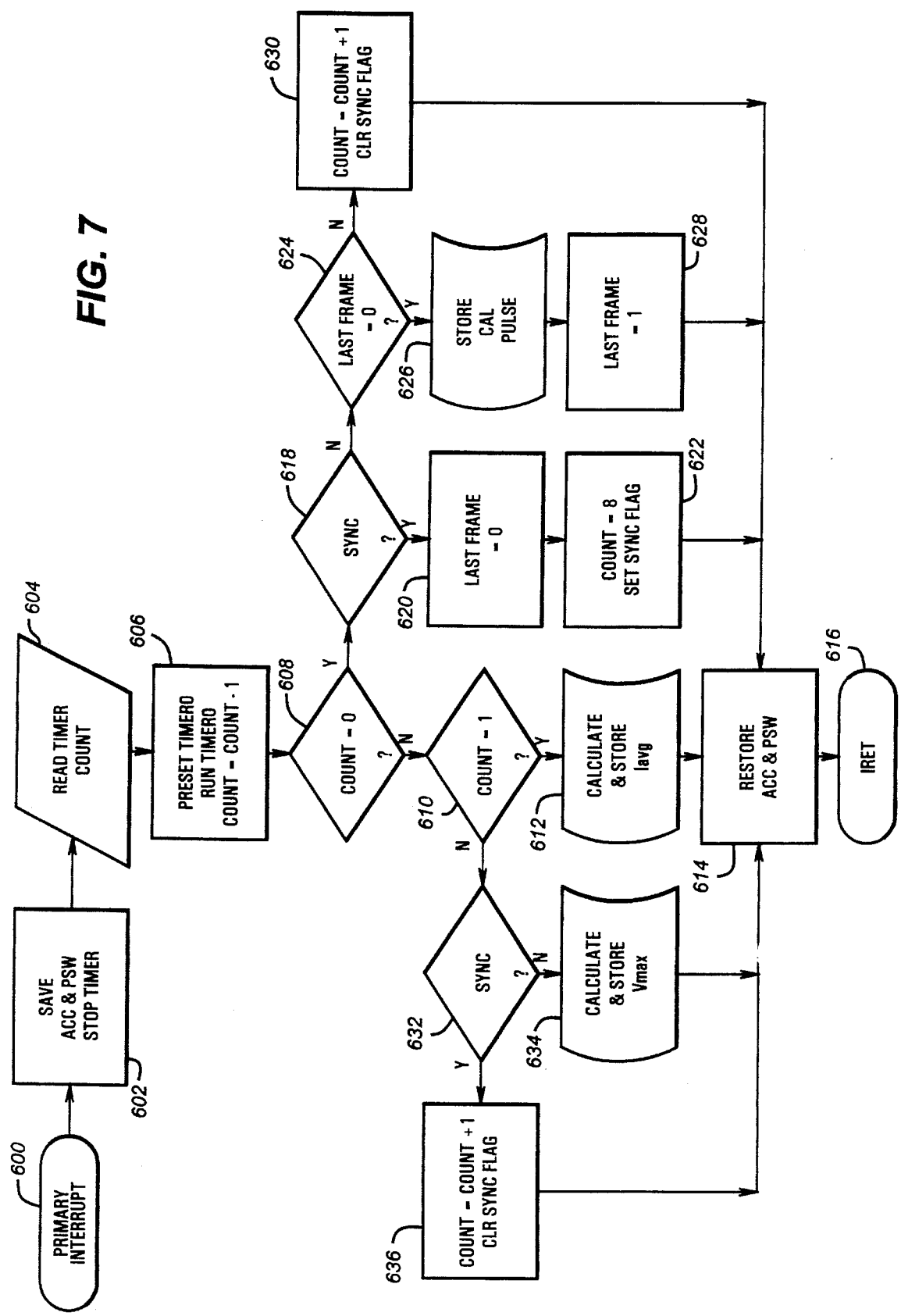

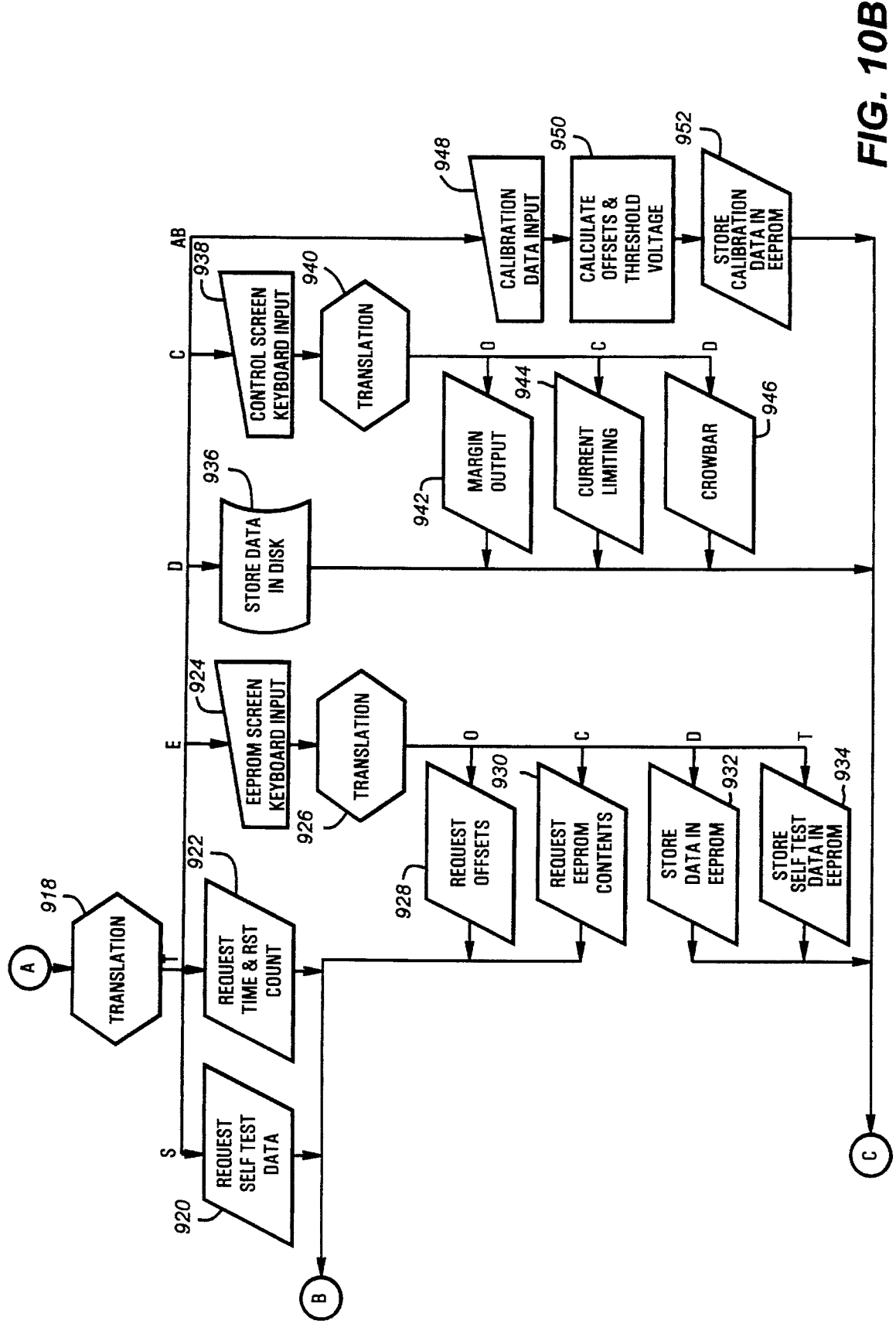

MONITORING AND CONTROL OF POWER SUPPLY FUNCTIONS USING A MICROCONTROLLER

SPECIFICATION

1. Field of the Invention

The present invention relates to a microcontroller circuit to monitor and control the functions and conditions of a power supply.

2. Description of the Related Art

A power supply is a vital and essential element in most electronic systems, including computer systems. Generally, power supplies are designed to provide the necessary voltages and currents within the desired specifications using internal control, and may possibly include hazard prevention circuitry. Externally, however, a typical power supply appears as little more than a box having one or more connectors providing the desired power sources. The typical power supply malfunctions without warning, which usually brings the operation of the electronic system to a halt. Thus, a power supply malfunction in a computer system may cause loss of valuable data and time.

A computer system usually contains valuable information and is a vital part of a business, particularly if the system is a file server in a network, such that a significant possibility of data loss or unanticipated down time is unacceptable. It is desirable, therefore, to be able to test the power supply periodically and to monitor the status, function and operation of the power supply to anticipate and prevent impending failure.

In many computer systems, the power supply is a self-contained unit providing only limited testing capability. Important internal voltages and current levels are not readily accessible. It is desirable to monitor the internal and external signals periodically. It is also desirable to monitor the power supply performance under various test conditions. It is further desirable to have convenient access to the configuration, status and operation information. computer systems today do not provide these desirable capabilities.

SUMMARY OF THE PRESENT INVENTION

The present invention is designed to provide easy access to the important operating parameters of a power supply and to test the operation of a power supply, in order to anticipate impending problems and to prevent hardware failures. To achieve these goals, the power supply monitoring and control system of the present invention is capable of retrieving vital power supply information or parameters, such as the input and output voltages and currents, and providing this information to a local or remote computer system. It is also capable of reconfiguring power supply operating parameters to test the power supply and to simulate various operating conditions. It provides the capability to vary the output current limits as well as the output voltage margins. It also provides a way to remotely shut down or recycle the power supply. The control circuitry performs time logging by summing the total number of hours the power supply has been in operating, as well as the number of times the power supply has been powered-up. A self calibration capability is added to provide accurate data throughout the life of the power supply.

There are two main portions of the power supply monitoring and control system of the present invention. The first portion is a microcontroller which may be built into the power supply or computer system itself or onto a separate card which may be plugged into the input/output (I/O) bus of the computer system. The microcontroller runs as a slave to a host computer system so that it receives and executes commands from the host and returns data requested by the host. The microcontroller collects and constantly updates certain data from the power supply. It also collects other data which is stored in memory coupled to the microcontroller. When a command is received from the host over a serial link, the microcontroller provides the requested data back over the serial link to the host. The use of the serial port allows remote monitoring and control.

The second portion of the power supply control and monitoring system of the present invention comprises an interface circuit which may comprise two sub-portions depending upon the power supply being monitored. It is desirable to monitor important parameters from the primary as well as the secondary side of most computer system power supplies. Thus, the first portion of the interface circuitry is a primary side status reporting which is isolated from the microcontroller control circuitry using an opto-coupler. In this manner, the interface circuitry on the primary side runs asynchronously and is not completely controlled by the microcontroller. It essentially measures the instantaneous bulk DC voltage applied to the primary coil of the power supply as well as the average input current provided to the power supply from the AC line. Since the primary side status reporting circuitry runs asynchronously, it interrupts the microcontroller during time intervals wherein the time interval represents a scaled value of the parameters being measured. In this manner, the primary side status reporting circuitry constantly provides information to the microcontroller so that the microcontroller can provide this information to the host computer. Due to temperature and time sensitivities, the primary side status reporting circuitry also provides a self calibration capability using a reference voltage to maintain the data integrity.

The second portion of the interface circuitry comprises a secondary side status reporting and configuration system. The secondary side of the interface circuitry is controlled directly by the microcontroller since isolation is not necessary. The secondary side circuitry provides the capability to monitor the output voltages and currents which are desired to be monitored by the host computer. The secondary circuitry also provides the capability to provide signals to vary certain operating parameters of the power supply. In this manner, the secondary side circuitry can vary output current limits, alter output voltage margins for testing purposes, and crowbar the power supply to shut it down or to recycle the power supply. The microcontroller includes a real time clock to keep track of the total number of hours of operation of the power supply. It also keeps a sum of the total number of times that the power supply has been powered up.

BRIEF DESCRIPTION OF THE DRAWINGS

A better understanding of the present invention can be obtained with the following detailed description of the preferred embodiment is considered in conjunction with the following drawings, in which:

FIG. 7 is a flow diagram illustrating a primary interrupt routine of a software program running on the microcontroller of the circuit of FIG. 4;

FIGS 10A and 10 B are a flow diagram illustrating the operation of a host software program running on the host computer of FIG. 1.

DETAILED DESCRIPTION OF THE PREFERRED EMBODIMENT

Figure 1:
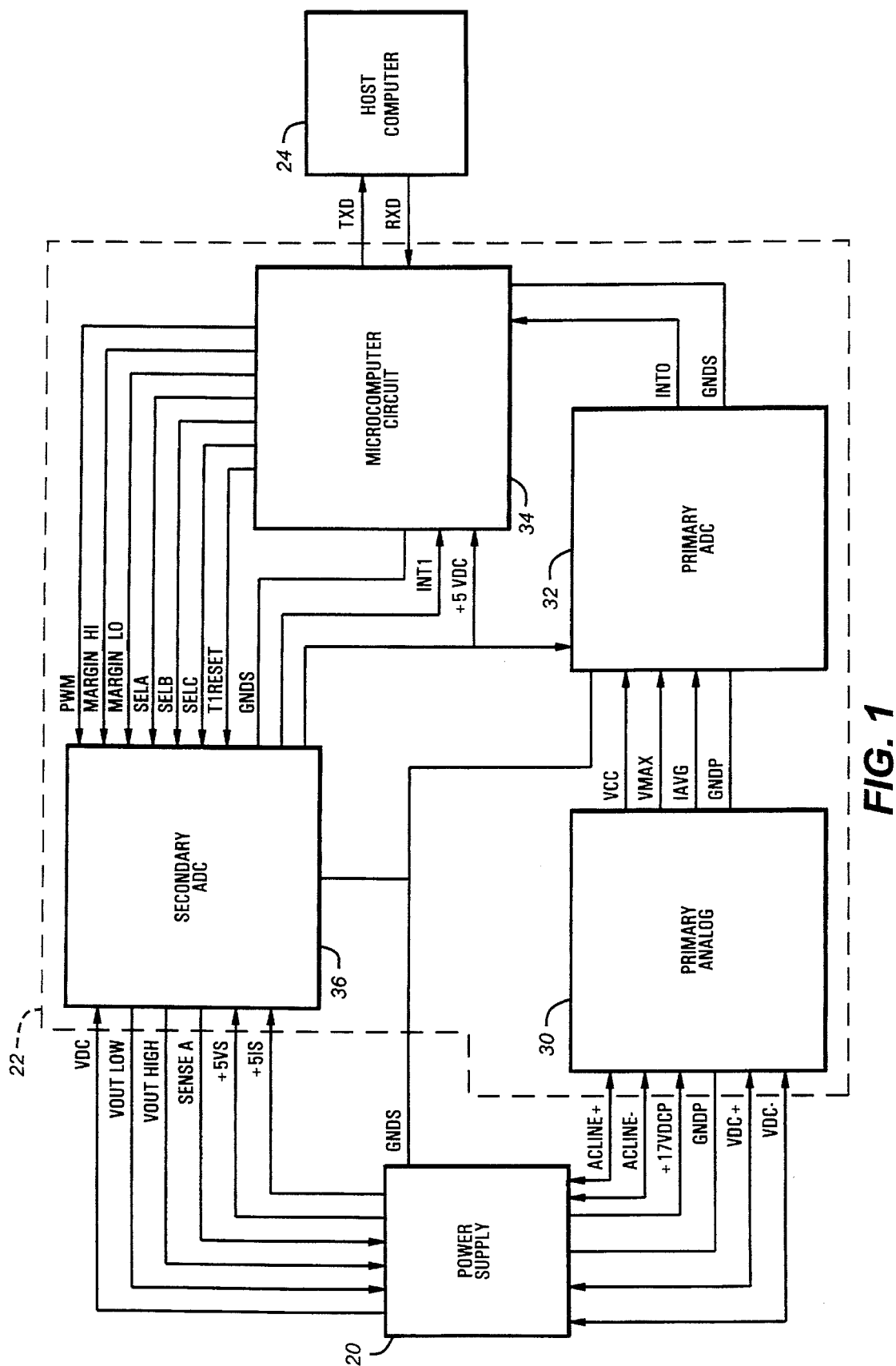
FIG. 1 is a block diagram of a power supply monitoring and control system of the present invention coupled to a power supply and a host computer.

Referring now to FIG. 1, a block diagram of a power supply monitoring and control circuit 22 of the present invention is shown coupled to a power supply 20 and a host computer 24, The power supply of the host computer 24 is preferably the power supply 20 shown in FIG. 1, although the present invention is not limited to this embodiment and the host computer 24 could remotely monitor a series of computer systems incorporating the present invention by a switching or dialup technique. The power supply monitoring and control circuit 22 is further divided into several individual blocks, each of which will be described in detail below. Various key voltage and current signals of the power supply 20 are coupled to and monitored by the power supply monitoring and control circuit 22. A typical power supply, such as the power supply 20, includes a primary circuit and a secondary circuit coupled on either side of a power transformer (not shown) and a feedback circuit to control its operation.

Figure 2:
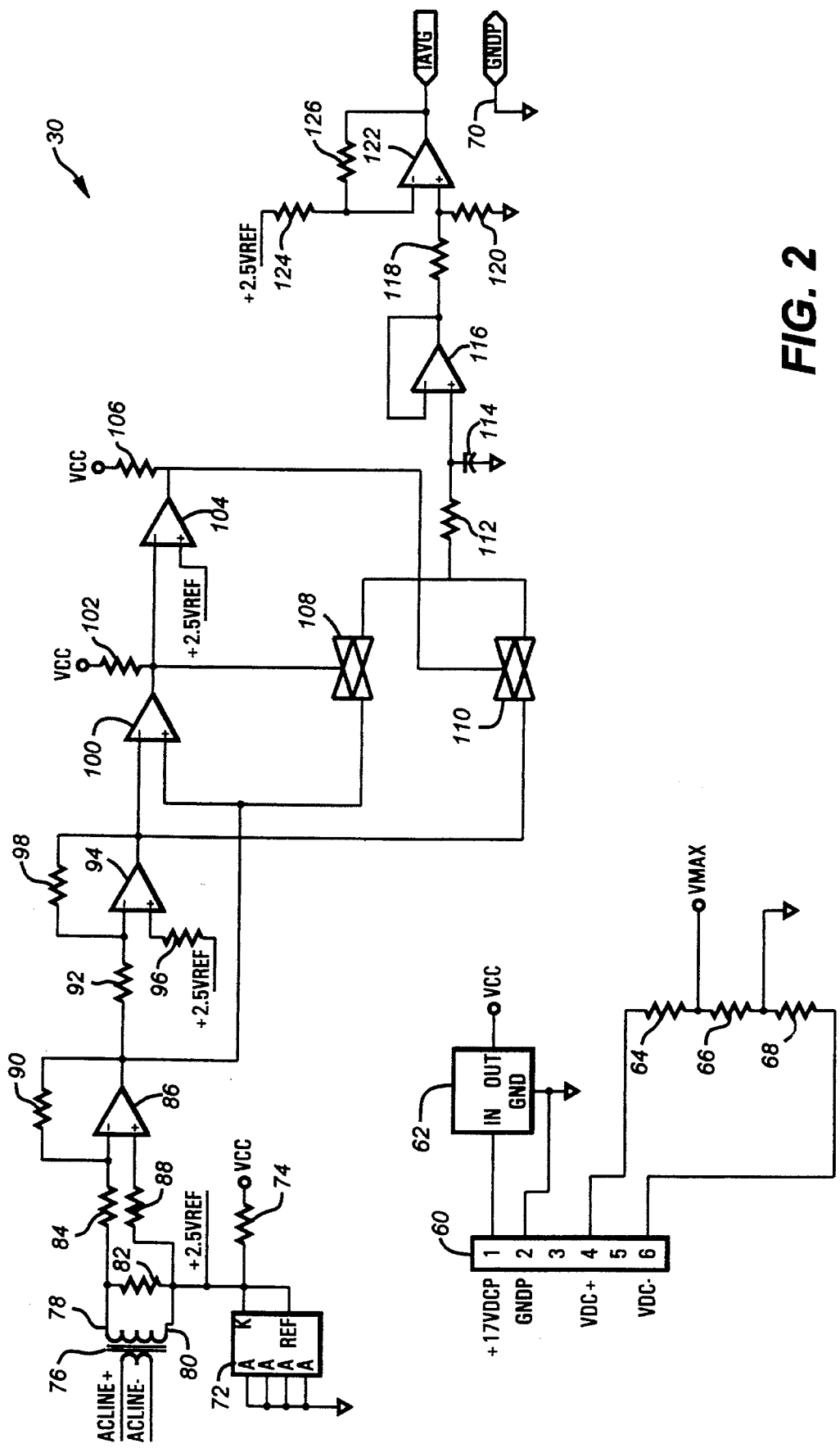
FIG. 2 is a schematic diagram showing the primary analog circuit of FIG. 1.

A primary analog circuit 30, which is part of the power supply monitoring and control circuit 22, is coupled to signals provided by the primary circuit of the power supply 20. In the preferred embodiment, the power supply monitoring and control circuit 22 monitors the input current of the power supply 20 through the AC line by connecting the common side of the AC line through the primary coil of a current sense transformer 76 (FIG. 2). The positive side of the primary coil is a signal referred to as ACLINE+ and the negative side is a signal referred to as ACLINE–. The power supply 20 typically includes an AC to DC converter to convert the AC line voltage to a relatively large DC voltage, which is provided across the primary coil of the transformer of the power supply 20. This large DC input voltage is connected to the primary analog circuit 30 through signals referred to as VDC+ and VDC–. The primary analog circuit 30 preferably receives its power from the power supply 20 from a signal +17VDCP and a signal GNDP. The GNDP signal is the ground for the primary circuit of the power supply 20 which provides ground for the primary analog circuit 30 and the primary ADC circuit 32. References to ground on the primary analog circuit 30 and the primary ADC circuit 32 are the primary ground, unless otherwise indicated. The voltage developed between the +17VDCP signal and ground is preferably 17 volts, although this voltage could be any other adequate voltage source provided by the power supply 20.

The primary analog circuit 30 converts the voltage provided by the +17VDCP signal into a regulated voltage developed between a signal VCC and ground, to be used by the primary analog circuit 30. The primary analog circuit 30 converts the large voltage between the VDC+ and VDC– signals to a smaller, more manageable and proportional voltage signal VMAX which preferably has a scale of 1 volt for every 100 volts of the voltage between the VDC+ and VDC– signals. The primary analog circuit 30 converts the current signal between the signals ACLINE+ and ACLINE– to a proportional voltage signal IAVG, wherein the IAVG signal preferably has a scale of 1 volt for every 1 amp of input current of the power supply 20.

A primary analog to digital converter (ADC) circuit 32 is connected to the VCC, VMAX and IAVG signals of the primary analog circuit 30. The regulated voltage of the VCC signal from the primary analog circuit 30 provides power to operate the primary ADC circuit 32. The primary ADC circuit 32 converts the VMAX and IAVG signals to digital pulses on a signal INT0 wherein the duration in microseconds of the pulses on the INT0 signal is proportional to the voltage of the VMAX and IAVG signals. The primary ADC circuit 32 also includes an opto-coupler 212 (FIG. 3) which is used to isolate the primary circuit of the power supply 20 from a microcontroller circuit 34 of the power supply monitoring and control circuit 22.

A secondary analog to digital conversion (ADC) circuit 36 is coupled to the secondary circuit of the power supply 20. A signal GNDS is the ground of the secondary circuit of the power supply 20 which provides ground for the secondary ADC circuit 36 and the microcontroller circuit 34. References to ground on the secondary ADC circuit 36 and the microcontroller circuit 34 are to the secondary ground unless otherwise indicated. Thus the GNDP and GNDS signals provide two separate grounds for isolation purposes between the primary and secondary of the power supply 20. The secondary ADC circuit 36 preferably receives power from the power supply 20 through a signal VDC. The VDC signal is preferably a non-interruptible auxiliary power source having a DC voltage of 8 volts, although it may be any adequate DC voltage source from the power supply 20. The power supply 20 preferably includes a 5 volt output, and a signal +5VS is provided from the power supply 20 to the secondary ADC circuit 36 to monitor the voltage level of the 5 volt output. A signal +5IS is a current sense of the 5 volt output of the power supply 20 which has a voltage level which is proportional to the output current.

The power supply 20 includes a feedback reference circuit (not shown) which is used by the power supply 20 to control its output voltages and current limits. A signal VOUT LOW and a signal VOUT HIGH are both provided by the secondary ADC circuit 36 to the power supply 20 to alter a feedback output voltage sense signal used to control the output voltage of the power supply 20. In this manner, the secondary ADC circuit 36 can test the output voltage of the power supply 20 during different operational conditions. Likewise, a signal SENSE A is provided from the secondary ADC circuit 36 to the power supply 20 to control the current limit of the power supply as well as crowbar or shutdown the power supply 20 as desired. The secondary ADC circuit 36 converts the voltage levels of the +5VS and +5IS signals to a digital signal on a signal INT1 provided to the microcontroller circuit 34.

The microcontroller circuit 34 is part of the power supply monitoring and control circuit 22 which includes a microcontroller 300 (FIG. 4) to control its operation. The microcontroller circuit 34 is coupled to the INT1 signal from the secondary ADC circuit 36 to determine the voltage level of the +5VS and +5IS signals. The microcontroller circuit 34 is connected to the INT0 signal from the primary ADC circuit 32 to determine the voltage level of the VMAX and IAVG signals. The microcontroller circuit 34 provides a signal PWM which controls the voltage of the SENSE A signal from the secondary ADC circuit 36 to the power supply 20. The PWM signal should not be confused with the PWM in a switching power supply. The PWM signal is used to generate a voltage reference to limit the output current, whereas a power supply PWM is used to adjust the duty cycle to regulate the output voltage of a switching power supply. The microcontroller circuit 34 provides a signal MARGIN_HI and a signal MARGIN_LOW to manipulate the VOUT LOW and VOUT HIGH signals, respectively. The microcontroller circuit 34 also provides three signals SELA, SELB and SELC to select the channel of the secondary ADC circuit 36 to determine which of the +5VS or +5IS signals is monitored by the INT1 signal. A signal T1RESET from the microcontroller circuit 34 provides a reset for a circuit within the secondary ADC circuit 36 which provides the INT1 signal.

The power supply monitoring and control circuit 22 of the present invention preferably operates as a slave device to the host computer system 24. A computer program running on the host computer 24, either independently or with the assistance of a system operator, sends commands to the microcontroller circuit 34 on a signal referred to as RXD, the receive data signal of a serial link between the microcontroller circuit 34 and the host computer 24. Similarly, the microcontroller circuit 34 provides responses and data to the host computer 24 on a signal referred to as TXD, the transmit data signal of the serial link.

Referring now to FIG. 2, a schematic diagram of the primary analog circuit 30 is shown. A connector 60 connects the primary circuit of the power supply 20 to the primary analog circuit 30. The +17VDCP signal is connected to pin 1 of the connector 60 and the GNDP signal is coupled through pin 2. The GNDP signal is connected to the ground of the primary analog circuit 30. A voltage regulator 62, which is preferably an MC78M08 8 volt linear voltage regulator manufactured by Motorola, Inc., has its input connected to the +17VDCP signal and its ground pin connected to ground. The output of the voltage regulator 62 provides the VCC signal.

The VDC+ and VDC− signals are coupled to pins 4 and 6, respectively, of the connector 60. One side of a resistor 64 is connected to the VDC+ signal and the other side of the resistor 64 is connected to one side of a resistor 66. The other side of the resistor 66 is connected to a resistor 68 and the other side of the resistor 68 is connected to the VDC− signal. The junction between the resistors 64 and 66 provides the VMAX signal and the junction between the resistors 66 and 68 is connected to ground. The resistors 64, 66 and 68 are preferably chosen so that every 1 volt of the VMAX signal represents 100 volts of the voltage between the VDC+ and VDC− signals. In the preferred embodiment, the voltage between the VDC+ and VDC− signals is approximately 280 volts, such that the typical voltage of the VMAX signal is 2.8 volts.

A voltage reference 72, which is preferably a 2.5 volt TL431ACDR precision voltage reference manufactured by Texas Instruments, Inc., has its anode terminals connected to ground and its K and REF reference terminals connected to one side of a resistor 74. The other side of the resistor 74 is connected to the VCC signal. In this manner, the voltage reference 72 provides a signal +2.5VREF at its reference terminal, which preferably has a level of 2.5 volts.

The AC line is routed directly to the primary analog circuit 30 providing the ACLINE+ and ACLINE− signals. A current transformer 76 has a primary coil which is connected to the ACLINE+ and ACLINE− signals. The positive terminal 78 of the secondary coil of the transformer 76 is connected to one side of a shunt resistor 82 and the other side of the shunt resistor 82 is connected to the negative terminal 80 of the transformer 76. The +2.5VREF signal is connected to the negative terminal 80 of the transformer 76 to provide a DC voltage offset of 2.5 volts. Therefore, the negative side the secondary coil 80 of the transformer 76 is maintained at 2.5 volts and the voltage developed across the resistor 82 is proportional to the input current of the power supply 20 plus 2.5 volts.

The positive terminal 78 of the transformer 76 is connected to one side of a resistor 84 and the other side of resistor 84 is connected to the inverting input of an amplifier 86. The negative terminal 80 of the transformer 76 is connected to one side of a resistor 88 and the other side of the resistor 88 is connected to the non-inverting input of the amplifier 86. A resistor 90 is connected between the inverting input and the output of the amplifier 86. The output of the amplifier 86 provides a sinusoidal voltage which is inversely proportional to the input current of the power supply 20.

The output of the amplifier 86 is connected to one side of a resistor 92 and the other side of resistor 92 is connected to the inverting input of an amplifier 94. The +2.5VREF signal is connected to one side of a resistor 96 and the other side of resistor 96 is connected to the non-inverting input of the amplifier 94. A feedback resistor 98 is connected between the inverting input and the output of the amplifier 94. The resistors 98, 92 and 96 are preferably chosen so that the amplifier 94 provides unity gain amplification shifted by 180° of the output of the amplifier 86. In this manner, as the output of the amplifier 86 goes positive, the output of the amplifier 94 goes negative and vice versa.

The output of the amplifier 94 is connected to the inverting input of a comparator 100. The output of the amplifier 86 is connected to the non-inverting input of the comparator 100. The output of the comparator 100 is connected to one side of a pull-up resistor 102 and the other side of the resistor 102 is connected to the VCC signal.

The output of the comparator 100 is connected to the inverting input of another comparator 104. The +2.5VREF signal is connected to the non-inverting input of the comparator 104. The output of the comparator 104 is connected to one side of a pull-up resistor 106 and the other side of resistor 106 is connected to the VCC signal. The comparator 104 is an inverter of the signal provided at the output of the comparator 100.

The output of the amplifier 86 is connected to the input of an analog switch 108. The output of the comparator 100 is connected to the control input of the analog switch 108. The output of the amplifier 94 is connected to the input of an analog switch 110, and the output of the comparator 104 is connected to the control input of the analog switch 110. The outputs of the analog switches 108 and 110 are connected together. In this manner, when the output of the comparator 100 is high, the output of the comparator 104 is low and the output of the amplifier 86 is provided at the output of the analog switch 108. When the output of the comparator 100 is low, the output of the comparator 104 is high and the output of the amplifier 94 is provided at the output of the buffer 110. Therefore, the analog switches 108 and 110 provide an amplified, full-wave rectified signal of the voltage across the resistor 82.

The outputs of the analog switches 108 and 110 are connected to one side of a filter resistor 112 and the other side of the filter resistor 112 is connected to the positive terminal of a filter capacitor 114. The negative side of the filter capacitor 114 is connected to ground. The resistor 112 and the capacitor 114 serve to filter and convert the full-wave rectified signal appearing at the outputs of the analog switches 108 and 110 to a DC voltage. The positive terminal of the filter capacitor 114 is connected to the non-inverting input of a voltage follower 116 and the inverting input of the voltage follower 116 is connected to its output. The output of the voltage follower 116 is connected to a resistor 118 and the other side of the resistor 118 is connected to one side of a resistor 120. The other side of the resistor 120 is connected to ground. The junction between the resistors 118 and 120 is connected to the non-inverting input of a differential amplifier 122. The inverting input of the amplifier 122 is connected to a resistor 124 and the other side of the resistor 124 is connected to the +2.5VREF signal. The inverting input of the amplifier 122 is also connected to a feedback resistor 126 and the other side of the resistor 126 is connected to the output of the amplifier 122. The output of the amplifier 122 is the IAVG signal, which preferably has a scale of 5 volts for every 5 amps of AC input current of the power supply 20.

Figure 3:
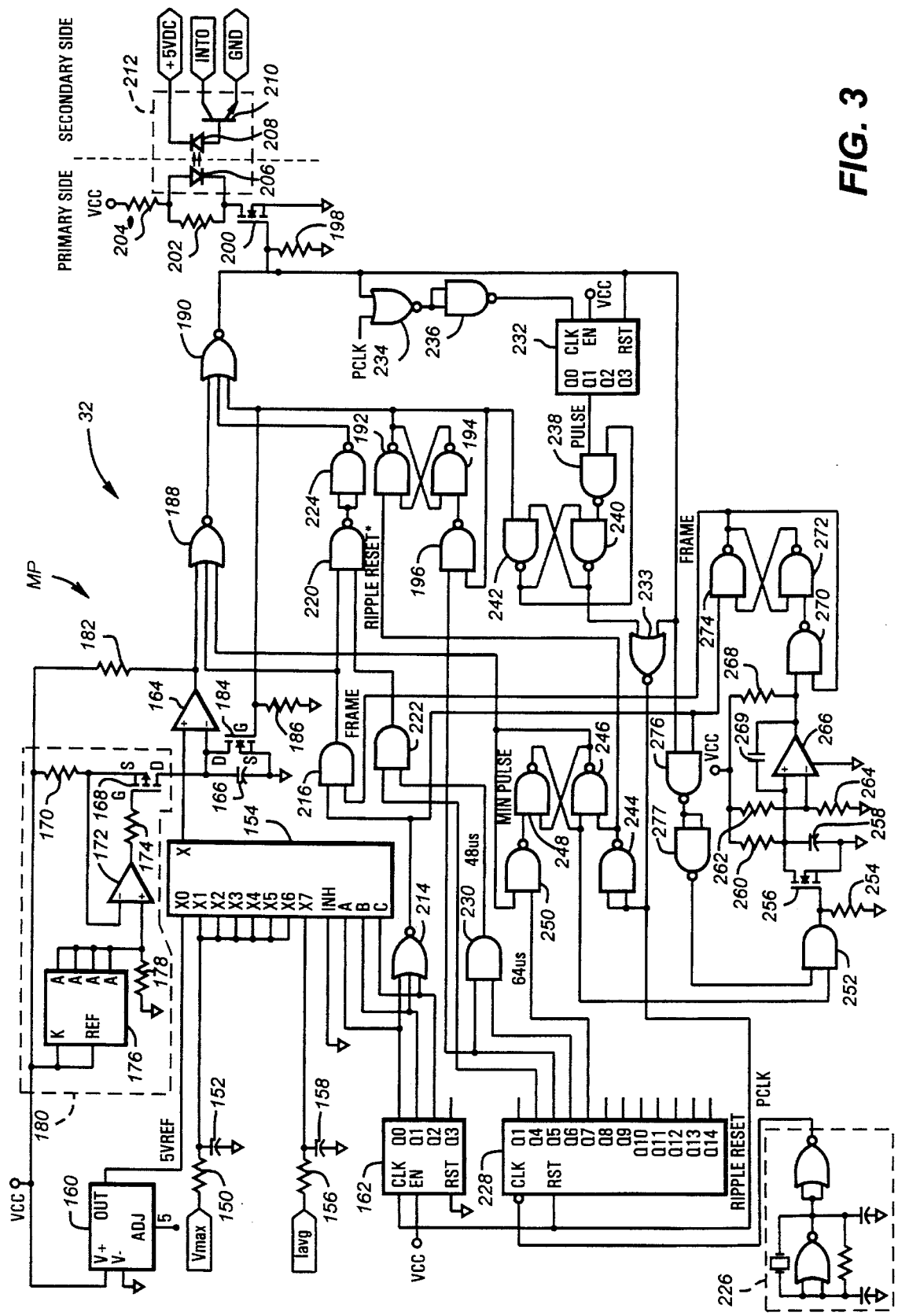
FIG. 3 is a schematic diagram of the primary analog to digital conversion circuit of FIG. 1.

Referring now to FIG. 3, a schematic diagram of the primary ADC circuit 32 is shown. The VMAX signal is connected to one side of a resistor 150 and the other side of the resistor 150 is connected to one side of a capacitor 152. The other side of the capacitor 152 is connected to ground. The junction between the resistor 150 and the capacitor 152 is connected to the X1, X2, X3, X4, X5 and X6 inputs of a multiplexer 154. The multiplexer 154 is preferably an CD4051 8 channel analog multiplexer/demultiplexer. The IAVG signal is connected to one side of a resistor 156 and the other side of the resistor 156 is connected to one side of a capacitor 158 and to the X7 input of the multiplexer 154. The other side of the capacitor 158 is connected to ground. The VCC signal is connected to the V+ input terminal of a 5 volt voltage reference 160 and the output of the voltage reference 160 is connected to the X0 input terminal of the multiplexer 154. The voltage reference 160 is preferably an LT1021-5 5 volt precision voltage reference manufactured by Linear Technology, and preferably provides a relatively accurate 5 volt reference signal, referred to as 5VREF. The V− input of the voltage reference 160 is connected to ground.

The multiplexer 154 has 3 select input terminals A, B and C which are used to select one of the signals provided at its X0–X7 input terminals to its X output terminal as is well known in the art. A counter 162 has its Q0, Q1 and Q2 output terminals connected to the A, B and C select inputs, respectively, of the multiplexer 154. The counter 162 is preferably one-half of an CD4520 dual binary up counter. The counter consecutively counts from 0 to 7 provided as a 3-bit binary number on its Q0–Q2 output terminals which corresponds to the X0–X7 input terminals of the multiplexer 154. In this manner, if the output of the counter 162 is the binary number 101, or 5, the VMAX signal connected to the X5 input terminal of the multiplexer 154 is provided to its X output terminal. The output binary number of the counter 162 will be hereinafter referred to as a channel, such that channels 0–7 correspond to the X0–X7 inputs of the multiplexer 154. Therefore, channel 0 selects the 5VREF signal, channels 1–6 select to the VMAX signal, and channel 7 selects the IAVG signal. It is understood, however, that channels 1–6 are not limited to selecting the VMAX signal but could be used to select other inputs such as temperature sensors.

A signal referred to as RIPPLE RESET is connected to the CLK input of the counter 162, wherein each rising edge of the RIPPLE RESET signal increments the channel of the counter 162.

The X output of the multiplexer 154 is connected to the non-inverting input of a comparator 164. The inverting input of the comparator 164 is coupled to one side of a capacitor 166, and the other side of the capacitor 166 is connected to ground. The inverting input terminal of the comparator 164 is also connected to the drain terminal of a p-channel enhancement metal oxide semiconductor field effect transistor (MOSFET) and the source terminal of the MOSFET 168 is connected to one side of a resistor 170. The other side of the resistor 170 is connected to the VCC signal. An amplifier 172 has its inverting input connected to the source terminal of the MOSFET 168 and the output of the amplifier 172 is connected to one side of a resistor 174. The other side of the resistor 174 is connected to the gate terminal of the MOSFET 168. The anode of a 2.5 volt voltage reference 176, which is preferably a 2.5 volt TL431ACDR manufactured by Texas Instruments, Inc., is connected to the non-inverting input of the amplifier 172 and to one side of a resistor 178. The other side of the resistor 178 is connected to ground. The K and REF reference terminals of the voltage reference 176 are coupled to the VCC signal. The amplifier 172, the resistors 170, 174 and 178, the MOSFET 168 and the voltage reference 176 form a constant current source 180 which provides a constant current to the capacitor 166.

A pull-up resistor 182 is connected to the output of the comparator 164 and the other side of the resistor 182 is connected to the VCC signal. An n-channel enhancement MOSFET 184 has its drain and source terminals connected in parallel with the capacitor 166 and its gate terminal connected to a signal referred to as RESET, which is also connected to one side of a resistor 186. The other side of the resistor 186 is connected to ground.

Operation of the comparator 164, the capacitor 166, and the constant current source 180, which will be referred to as a measurement circuit MP, will now be described. The counter 162 selects the channel of the multiplexer 154, which selects the corresponding input to be provided to the non-inverting terminal of the comparator 164. The RESET signal is initially asserted high, thereby turning on the MOSFET 184, which grounds the capacitor 166 such that the output of the comparator 164 is initially high. When the RESET signal is negated low, the MOSFET 184 is turned off and the constant current source 180 provides a constant current to the capacitor 166 such that the voltage at the inverting input of the comparator 164 begins to rise, preferably at a linear rate of 1 volt per 178 microseconds. When the voltage across the capacitor 166 becomes approximately equal to the voltage at the X output of the multiplexer 154, the output of the comparator 164 goes low. In this manner, the time from when the MOSFET 184 is turned off to the time the output of the comparator 164 goes low is proportional to the voltage provided to the output of the multiplexer 154. This time interval can be converted to determine the voltage level of the selected input of the multiplexer 154.

The output of the comparator 164 is connected to one input of a 3 input NOR gate 188. The output of the NOR gate 188 is connected to one input of a 3 input NOR gate 190. The RESET signal is connected to a second input of the NOR gate 190. The output of the NOR gate 190 is connected to one side of a resistor 198 and to the gate terminal of an n-channel enhancement MOSFET 200. The other side of the resistor 198 and the source terminal of the MOSFET 200 are connected to ground. The drain terminal of the MOSFET 200 is connected to one side of a shunt resistor 202 and the other side of the resistor 202 is connected to one side of a pull-up resistor 204. The other side of the resistor 204 is connected to the VCC signal. The junction between the resistors 202 and 204 is connected to the anode of a light-emitting diode (LED) 206 and the cathode of the LED 206 is connected to the drain terminal of the MOSFET 200. The LED 206 is part of a high slew rate opto-coupler circuit 212, which is preferably a CNW4502 manufactured by Hewlett Packard. The opto-coupler circuit 212 also includes a photodiode 208 and a transistor 210. The base of the transistor 210 is connected to the anode of the photodiode 208 and the cathode of the photodiode 208 is connected to an external signal +5VDC, which is preferably 5 volts. The emitter terminal of the transistor 210 is connected to the secondary ground rather than the primary ground for isolation purposes between the primary and secondary of the power supply 20, and the collector provides the INT0 signal. The INT0 signal is normally pulled high externally by a resistor connected to the +5VDC signal.

Assuming the other inputs of the NOR gates 188 and 190 are low and the RESET signal is high, the output of the NOR gate 190 is low turning off the MOSFET 200 so that no current flows through the LED 206. When the LED 206 is off, no current flows through the diode 208 so that the transistor 210 is turned off. When the transistor 210 is turned off, the INT0 signal is pulled high due to the open collector of the transistor 210 and the +5VDC signal. When the RESET signal is negated low so that the output of the NOR gate 190 is high, the MOSFET 200 is turned on, allowing current to flow through the LED 206. This activates the diode 208 which also turns on the transistor 210, thereby pulling the INT0 signal to ground. When the output of the comparator 164 goes low, the output of the NOR gate 188 goes high, pulling the output of the NOR gate 190 low, thereby negating the INT0 signal high. Thus, the INT0 signal is low from when the RESET signal is pulled low until the output of the capacitor 164 goes low. In this manner, the negative pulse width of the INT0 signal has a duration which is proportional to the voltage of the signal provided at the output of the multiplexer 154.

The Q0–Q2 outputs of the counter 162 are each connected to one input of a three input NOR gate 214. The output of the NOR gate 214 is connected to one input of a two input AND gate 216 and the output of the AND gate 216 is coupled to a second input of the NOR gate 188 and to one input of a two input NAND gate 220. The other input of the AND gate 216 is connected to a signal referred to as FRAME which is provided by the output of a two input NAND gate 274. The output of the NAND gate 274 is normally high as will be described in detail later. The other input of the NAND gate 220 is connected to the output of a two input AND gate 222. The output of the NAND gate 220 is connected to the input of an inverter 224, and the output of the inverter 224 is connected to a third input of the NOR gate 190.

A 1 MHz crystal oscillator circuit 226 provides a 1 MHz clock signal, referred to as a signal PCLK, which is connected to the clock input of a counter 228. The counter 228 is preferably a CD4020 14 bit counter. In this manner, when the counter 228 is being clocked by the PCLK signal, the counter 228 functions as a timer circuit wherein output terminals Q4, Q5, Q6 and Q7 of the counter 228 provide clock signals with a rising edge every 8, 16, 32 and 64 microseconds, respectively. The Q4 output terminal of the counter 228 is connected to one input of the AND gate 222. The Q5 and Q6 output terminals are each connected to a first and a second input, respectively, of a two input AND gate 230. The output of the AND gate 230 is connected to the other input of the AND gate 222.

The Q5 output terminal of the counter 228 is also connected to one input of a two input NAND gate 196. The RESET signal is connected to the other input of the NAND gate 196. The output of the NAND gate 196 is connected to one input of a two input NAND gate 194 and the output of the NAND gate 194 is connected to one input of a two input NAND gate 192. The output of the NAND gate 192 provides the RESET signal which is connected to the other input of the NAND gate 194.

The output of the NOR gate 190 is connected to the RST input terminal of a counter 232 and also to one input of a two input NOR gate 233. The counter 232 is preferably one half of a CD4520 dual binary up counter. The output of the NOR gate 190 is also connected to one input of a two input NOR gate 234 and the other input of the NOR gate 234 is connected to the PCLK signal. The output of the NOR gate 234 is connected to the input of an inverter 236 and the output of the inverter 236 is connected to the clock input of a the counter 232.

The Q2 output terminal of the counter 232 is referred to as a signal PULSE, which is connected to one input of a two input NAND gate 238. The output of the NAND gate 238 is connected to one input of a two input NAND gate 240 and the other input of the NAND gate 238. The output of the NAND gate 240 is connected to one input of a two input NAND gate 242 and to the other input of the NOR gate 233. The output of the NAND gate 242 is connected to the other input of the NAND gate 240 and to the other input of the NAND gate 238. The other input of the NAND gate 242 is connected to the RESET signal. The output of the NOR gate 233 provides the RIPPLE RESET signal which is connected to the RST input terminal of the counter 228 and to the input of an inverter 244. The output of the inverter 244 provides a signal RIPPLE RESET* which is connected to the other input of the NAND gate 192 and to one input of a two input NAND gate 246. The asterisk at the end of the RIPPLE RESET* signal indicates that it is the inverted version of the RIPPLE RESET signal. The output of the NAND gate 246 provides a signal MIN PULSE which is connected to one input of a two input NAND gate 248 and to the third input of the NOR gate 188. The output of the NAND gate 248 is connected to the other input of the NAND gate 246. The MIN PULSE signal is also connected to one input of a two input NAND gate 250. The Q7 output of the counter 228 is connected to the other input of the NAND gate 250 and the output of the NAND 250 is connected to the other input of the NAND gate 248.

When the output of the NOR gate 190 is high, the NOR gate 234 and the inverter 236 hold the clock and RST inputs of the counter 232 high so that the PULSE signal remains low. The RIPPLE RESET signal is also low so that the clock input of the counter 162 is held low and the RST input terminal of the counter 228 is low, thereby enabling the counter 228. The output of NAND gate 242 is high and the output of the NAND gate 240 is low. When the output of the NOR gate 190 goes low, the PCLK signal begins clocking the counter 232 since the RST input terminal of the counter 232 is also low. The falling edge of the output of the NOR gate 190 also causes the RIPPLE RESET signal to go high, thereby resetting the counter 228 so that its Q4–Q7 output terminals remain low, and provides a clock pulse to the counter 162 causing it to switch to the next channel. The RIPPLE RESET* signal goes low forcing the RESET signal high, thereby grounding the capacitor 166.

The PULSE signal goes high 2 microseconds after the output of the NOR gate 190 goes low. This forces the output of the NAND gate 238 low and the output of the NAND gate 240 high and the output of the NAND gate 242 low, which forces the RIPPLE RESET signal low again. In this manner, a 2 microsecond pulse appears on the RIPPLE RESET signal which resets the counter 228, clocks the counter 162 thereby switching to the next channel, and resets the measurement circuit MP. When the RIPPLE RESET signal is negated low, the counter 228 begins timing again. After 16 microseconds, the Q5 output of the counter 228 goes high forcing the output of the NAND gate 196 low and the output of the NAND gate 194 high, which negates the RESET signal low again. Therefore, 16 microseconds after the counter 228 is reset plus the 2 microsecond PULSE signal from the counter 232 provides an 18 microsecond dead time delay between consecutive channels of the counter 162, and between consecutive measurements by the measurement circuit MP. In this manner, the voltage levels of the inputs to the multiplexer 154 will be measured sequentially by the measurement circuit MP which also appears as a pulse on the INT0 signal.

Recall that the MIN PULSE signal is connected to one input of the NOR gate 188, holding its output low at the beginning of a measurement cycle. When the Q7 output terminal of the counter 228 goes high 64 microseconds after the counter 228 is reset, the output of the NAND gate 250 goes low, forcing the output of the NAND gate 248 high and the MIN PULSE signal low. In this manner, the output of the NOR gate 188 is held low for the first 48 microseconds of every cycle plus the 18 microsecond dead time delay of the counters 228 and 232. If the output of the comparator 164 goes low before 48 microseconds after the capacitor 166 begins charging, the MIN PULSE signal holds the output of the NOR gate 188 low until after 48 microseconds. During measurements, therefore, the negative logic pulse on the INT0 signal will be at least 48 microseconds in duration regardless of the voltage at the output of the multiplexer 154, providing a minimum pulse width of 48 microseconds of the INT0 signal to allow detection of a SYNC pulse, described below.

A frame is a sequence of 8 consecutive pulses of the INT0 signal beginning with a pulse corresponding to channel 0 and ending with a pulse corresponding to channel 7. There are two types of frames as determined by the FRAME signal. When the FRAME signal is high, a frame 0 is occurring wherein a SYNC pulse initiates the frame. If the FRAME signal is low, a frame 1 is occurring wherein a calibration pulse initiates the frame.

When the output of the binary counter 162 is at channel 0 and the FRAME signal is high corresponding to a frame 0, the output of the NOR gate 214 is high so that the output of the AND gate 216 is also high, thereby keeping the output of the NOR gate 188 low. In this manner, the measurement circuit MP is effectively disabled. The pulse appearing on the INT0 signal is controlled by the AND gates 222 and 230 during a frame 0, channel 0. The output of the NAND gate 222 goes high when the Q4, Q5 and Q6 output terminals of the counter 228 are all asserted high so that the output of the AND gate 230 is also high. This forces the output of the inverter 224 high which terminates the pulse on the INT0 signal. The pulse on the INT0 signal is, therefore, terminated at the summation of the times of the rising edges from the Q4–Q6 terminals which is 8, 16 and 32 microseconds, respectively, for a total 56 microseconds after the counter 228 has been reset. Since there is a 16 microsecond delay, the pulse at the INT0 signal is 40 microseconds in duration. This 40 microsecond pulse is referred to as the SYNC pulse which occurs during channel 0, frame 0.

When the FRAME signal is low, a frame 1 occurs wherein the output of the AND gate 216 is low and the output of the NAND gate 220 is held high, thereby disabling the operation of the AND gates 230 and 222. During a frame 1, the outputs of the AND gate 216 and the inverter 224 are held low effectively enabling the NOR gates 188 and 190 such that the output of the comparator 164 controls the duration of the pulse at the INT0 signal. When set to channel 0, frame 1, the 5VREF signal is measured. This is referred to as a calibration pulse which is used to calibrate the primary ADC circuit 32. Due to circuit tolerances and variations during operation of the primary ADC circuit 32, the charging time of the capacitor 166 may vary such that it is necessary to measure the time duration of the pulse on the INT0 signal of a known voltage to determine an accurate conversion factor for subsequent measurements. Normally, the capacitor 166 charges at 1 volt per 178 microseconds such that a 5 volt reference will cause an 890 microsecond pulse at the INT0 signal. However, conditions may change such that the capacitor 166 charges faster or more slowly. For example, if it takes 950 microseconds to charge the capacitor 166 to 5 volts, a new conversion factor of 190 microseconds per volt will be used for subsequent measurements. A frame 1, otherwise known as a calibration cycle, occurs every 2 seconds as described below.

The output of the NAND gate 248 is connected to one input of a two input AND gate 252 and the output of the NOR gate 214 is connected to one input of a two input NAND gate 276. The output of the NOR gate 190 is connected to the other input of the NAND gate 276, and the output of the NAND gate 276 is connected to the input of an inverter 277. The output of the inverter 277 is connected to the other input of the AND gate 252. The output of the AND gate 252 is connected to one side of a resistor 254 and to the gate terminal of an n-channel enhancement MOSFET 256. The other side of the resistor 254 and the source terminal of the MOSFET 256 are connected to ground. The drain terminal of the MOSFET 256 is connected to one side of a capacitor 258, to one side of a resistor 260, and to the non-inverting input of a comparator 266. The other side of the resistor 260 is connected to the VCC signal and the other side of the capacitor 258 is connected to ground. The inverting input of the comparator 266 is connected to one side of a resistor 262 and to one side of another resistor 264. The other side of the resistor 262 is connected to the VCC signal and the other side of the resistor 264 is connected to ground. A hysteresis capacitor 269 is connected between the non-inverting input and the output of the comparator 266. The output of the comparator 266 is connected to one side of a pull-up resistor 268 and the other side of the pull-up resistor 268 is connected to the VCC signal.

The values of the resistors 260, 262, 264 and 268 and the capacitor 258 are preferably chosen to configure the comparator 266 as a 2 second timer. The resistors 262 and 264 form a voltage divider of the VCC signal to provide a reference voltage at the inverting input of the comparator 266. When the output of the AND gate 252 is high, the MOSFET 256 is turned on, thereby grounding the capacitor 258 so that the output of the comparator 266 is low. When the output of the AND gate 252 goes low, the MOSFET 256 is turned off and the capacitor 258 begins charging from the VCC signal through the resistor 260. When the voltage across the capacitor 258 becomes equal to the reference voltage across the resistor 264, the output of the comparator 266 goes high. The time duration from when the output of the AND gate 252 goes low until the comparator 266 goes high is preferably 2 seconds.

The output of the comparator 266 is connected to one input of a two input NAND gate 270. The output of the NAND gate 270 is connected to one input of a two input NAND gate 272 and the output of the NAND gate 272 is connected to one input of a two input NAND gate 274. The output of the NAND gate 274 provides the FRAME signal which is connected to the other inputs of the NAND gates 270 and 272. The output of the NOR gate 214 is connected to the other input of the NAND gate 274.

The two second timer operates to cause a frame 1 to occur approximately once every 2 seconds. Assume an initial condition wherein the output of the AND gate 252 is high and then goes low and the FRAME signal is high. The capacitor 258 charges for approximately two seconds during which time a series of consecutive frame 0's occur. The voltage across the capacitor 258 then becomes greater than the voltage across the resistor 264 causing the output of the comparator 266 to go high. This causes the output of the NAND gate 270 to go low, forcing the output of the NAND gate 272 high. Subsequently, a channel 0 occurs so that the output of the NOR gate 214 goes high, setting the FRAME signal low, thereby initiating a frame 1. The output of the AND gate 216 is held low, thereby disabling the SYNC pulse and allowing a measurement of the 5VREF signal which causes a calibration pulse on the INT0 signal. After 48 microseconds into the calibration pulse, the Q7 output terminal of the counter 228 goes high, forcing the output of the NAND gate 250 low and the NAND gate 248 high. At the end of the calibration pulse, the output of the NOR gate 190 goes high, forcing the output of the NAND gate 276 low and the inverter 277 high. The output of the AND gate 252 goes high, grounding the capacitor 258. The channel switches to channel 1, and the output of the NOR gate 214 goes low, resetting the FRAME signal high. The FRAME signal remains high until after another 2 seconds elapses.

To summarize the operation of the primary ADC circuit 32, a continuous sequence of consecutive frame 0's occur wherein each frame comprises eight channels, each channel corresponding to a pulse appearing on the INT0 signal beginning with a 40 microsecond synchronization pulse followed by 6 pulses representing the measurement of the VMAX signal and ending with a pulse representing the measurement of the IAVG signal. After 2 seconds of consecutive frame 0's, a calibration cycle or frame 1 occurs which is the same as the frame 0 except that during channel 0 a calibration pulse occurs. During pulses representing measurements of the VMAX and IAVG signals, the MIN PULSE signal prevents a measurement pulse duration of less than 48 microseconds. This prevents a voltage measurement from being confused with a SYNC pulse which can be identified by the fact that it is a duration of only 40 microseconds.

An alternative form of the primary ADC circuit 32 allows a pulse representing the measurement of the IAVG signal to be less than 48 microseconds since the current through the primary of the power supply 20 could be small. The microcontroller circuit 34 is designed to recognize this condition of this alternate embodiment of the primary ADC circuit 32 such that a measurement of the IAVG signal is not confused with a SYNC pulse.

Figure 4:
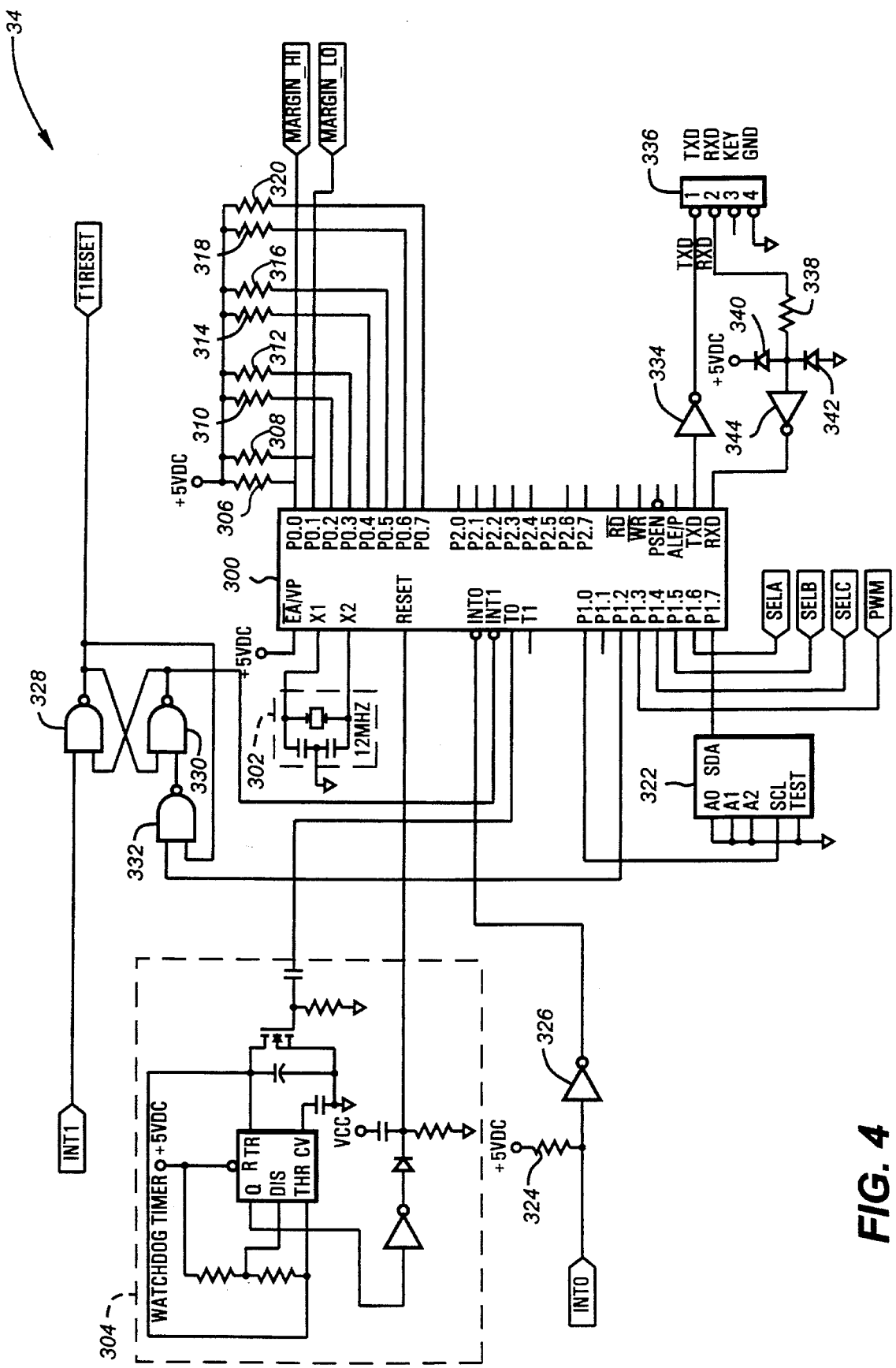
FIG. 4 is a schematic diagram of the microcontroller circuit of FIG. 1.

Referring now to FIG. 4, a schematic diagram of the microcontroller circuit 34 is shown. A microcontroller 300, which is preferably an 80C51FC microcontroller manufactured by Intel Corporation, is provided to control the power supply monitoring and control circuit 22. The microcontroller 300 preferably includes 256 bytes of internal random access memory (RAM) for storing data while the microcontroller 300 is operating. Power is provided to the microcontroller circuit 34 by the 5 volt +5VDC signal from the secondary ADC circuit 36. The microcontroller 300 is clocked by a 12 MHz ceramic resonator 302 which is provided to the X1 and X2 input terminals of the microcontroller 300. An output terminal T0 of the microcontroller 300 is connected to an input of a watchdog timer circuit 304. The watchdog timer circuit 304 has an output which is connected to the reset input terminal of the microcontroller 300. During normal operation, the microcontroller 300 runs a program which outputs a pulse on the T0 output during each iteration of the program. In this manner, if the microcontroller 300 is operating properly, the pulse should occur at least before the expiration of 2 seconds since the previous pulse or else the microcontroller 300 is operating abnormally and needs to be reset. The watchdog timer circuit 304 is reset with each pulse received from the T0 output of the microcontroller 300 so that if 2 seconds elapses without a pulse from the T0 output of the microcontroller 300, the watchdog timer circuit 304 asserts the reset terminal of the microcontroller 300 high to reset the microcontroller 300.

The microcontroller 300 includes a plurality of 8 bit individually addressable input/output (I/O) ports Wherein only 2 of the ports are used in the preferred embodiment of the present invention. Port 0 includes 8 I/O terminals referred to as P0.0–P0.7. Each of the I/O terminals P0.0–P0.7 are connected, respectively, to one side of eight pull-up resistors 306, 308, 310, 312, 314, 316, 318 and 320, and the other side of the resistors 306–320 are connected to the +5VDC signal. The microcontroller 300 outputs the MARGIN_HI signal on the P0.0 output terminal and the MARGIN_LO signal on the P0.1 output terminal. The microcontroller 300 uses a second 8 bit I/O port which includes 8 I/O terminals P1.0–P1.7. The P1.0 terminal is connected to the set clock (SCL) input of an electrically erasable programmable read only memory 322 (EEPROM). The P1.7 terminal is connected to the set data (SDA) terminal of the EEPROM 322. The EEPROM 322 is preferably a X24CO2 256 byte EEPROM manufactured by Xicor, Inc., which is used to store configuration parameters, power failure shutdown data as well as other data from the power supply 20 which will be described more in detail below. The P1.4, P1.5 and P1.6 terminals of the microcontroller 300 provide the SELA, SELB and SELC signals, respectively. The P1.3 terminal of the microcontroller 300 provides the PWM signal.

The microcontroller 300 includes 2 interrupt input terminals INT0 and INT1 wherein when either of the inputs are pulled low, the microcontroller 300 is interrupted and runs an interrupt routine associated with that interrupt terminal. The INT0 signal is connected to one side of a pull-up resistor 324 and to the input of an inverter 326. The other side of the pull-up resistor 324 is connected to the +5VDC signal and the output of the inverter 326 is connected to the INT0 terminal of the microcontroller 300. At the end of each pulse on the INT0 signal, the rising edge of the INT0 signal forces the output of the invertor 326 low and interrupts the microcontroller 300. The microcontroller 300 then runs a primary interrupt routine (FIG. 7) wherein it stops an internal timer, referred to as TIMER0, stores the value of TIMER0 in its internal RAM, and resets TIMER0 at approximately the same time that the INT0 signal is again pulled low to start the next pulse. In this manner, the microcontroller 300 uses its internal timer TIMER0 to measure the duration of each of the pulses occurring on the INT0 signal.

An INT1 signal is input from the secondary ADC circuit 36 to one input of a two input NAND gate 328. The output of the NAND gate 328 T1RESET signal which is connected to one input of a two input NAND gate 330 and to one input of another two input NAND gate 332. The output of the NAND gate 330 is connected to the other input of the NAND gate 328 and to the INT1 terminal of the microcontroller 300. The output of the NAND gate 332 is connected to the other input of the NAND gate 330. The other input of the NAND gate 332 is connected to the P1.2 terminal of the microcontroller 300. The P1.2 terminal of the microcontroller 300 is initially negated low, and the INT1 and T1RESET signals are initially asserted high. The microcontroller 300 asserts a 3-bit binary number of the SELA, SELB and SELC signals which represents the channel of the secondary ADC circuit 36. The microcontroller 300 then sets the P1.2 output high, which forces the output of the NAND gate 332 low, resetting the output of the NAND gate 330 high and the T1RESET signal low. At approximately the same time, the microcontroller 300 restarts a timer, referred to as TIMER1, at approximately the same time that the T1RESET signal is pulled low. A measurement circuit MS (FIG. 5A) on the secondary ADC circuit 36 converts the voltage of the signal corresponding to the channel to a number of microseconds in a manner similar to circuit MP, wherein the INT1 signal is asserted low at the completion of the measurement. When the INT1 signal is asserted low, the T1RESET signal is asserted high and the INT1 terminal of the microcontroller 300 is asserted low. The microcontroller 300 is interrupted and runs a secondary interrupt routine (FIG. 8) which stops the timer TIMER1 and stores its number in the internal RAM of the microcontroller 300, the number representing the measurement of the signal of the secondary of the power supply 20 being measured. A new channel is then provided and the process is repeated. In this manner, the microcontroller 300 can measure signals from the secondary of the power supply 20 which will be described further below.

The microcontroller 300 also includes a universal asynchronous receiver/transmitter (UART) which is coupled to a serial port on the microcontroller 300 comprising a serial output terminal TXD and a serial input terminal RXD. The TXD output terminal is connected to the input of an invertor 334 and the output of the invertor 334 is the TXD signal which is connected to pin 1 of a connector 336. Pin 2 of the connector 336 is connected to the RXD signal which is connected to one side of a resistor 338 and the other side of resistor 338 is connected to the anode of a diode 340, to the cathode of a diode 342 and to the input of an invertor 344. The cathode of the diode 340 is connected to the +5VDC signal and the anode of the diode 342 is connected to ground. The output of the invertor 344 is connected to the RXD input terminal of the microcontroller 300. The microcontroller 300 preferably operates as a slave device to the host computer 24. The host computer 24 communicates by sending commands to the microcontroller 300 through the RXD signal. The microcontroller 300 sends data, status information and other responses to its TXD output terminal and to the TXD signal. The serial communications protocol established between the microcontroller 300 and the host computer 24 can follow any of the standards known in the industry, and will not be described in detail.

The microcontroller 300 includes a real time counter which may be used to determine the total amount of elapsed time that the microcontroller 300 is in operation, which approximately corresponds to the total elapsed time of operation of the power supply 20. A parameter, referred to as TIME, is used to maintain the total elapsed time which is stored in the EEPROM 322. As described further below, each time the microcontroller 300 is powered up, it reads the parameter TIME from the EEPROM 322 into the internal RAM of the microcontroller 300 and constantly updates or increments it during operation. Upon power-down, the updated or accumulated value of the TIME parameter is restored back into the EEPROM 322. In this manner, the total amount of the elapsed time of operation of the power supply 20 is maintained as represented by the parameter TIME.

Figure 5A:
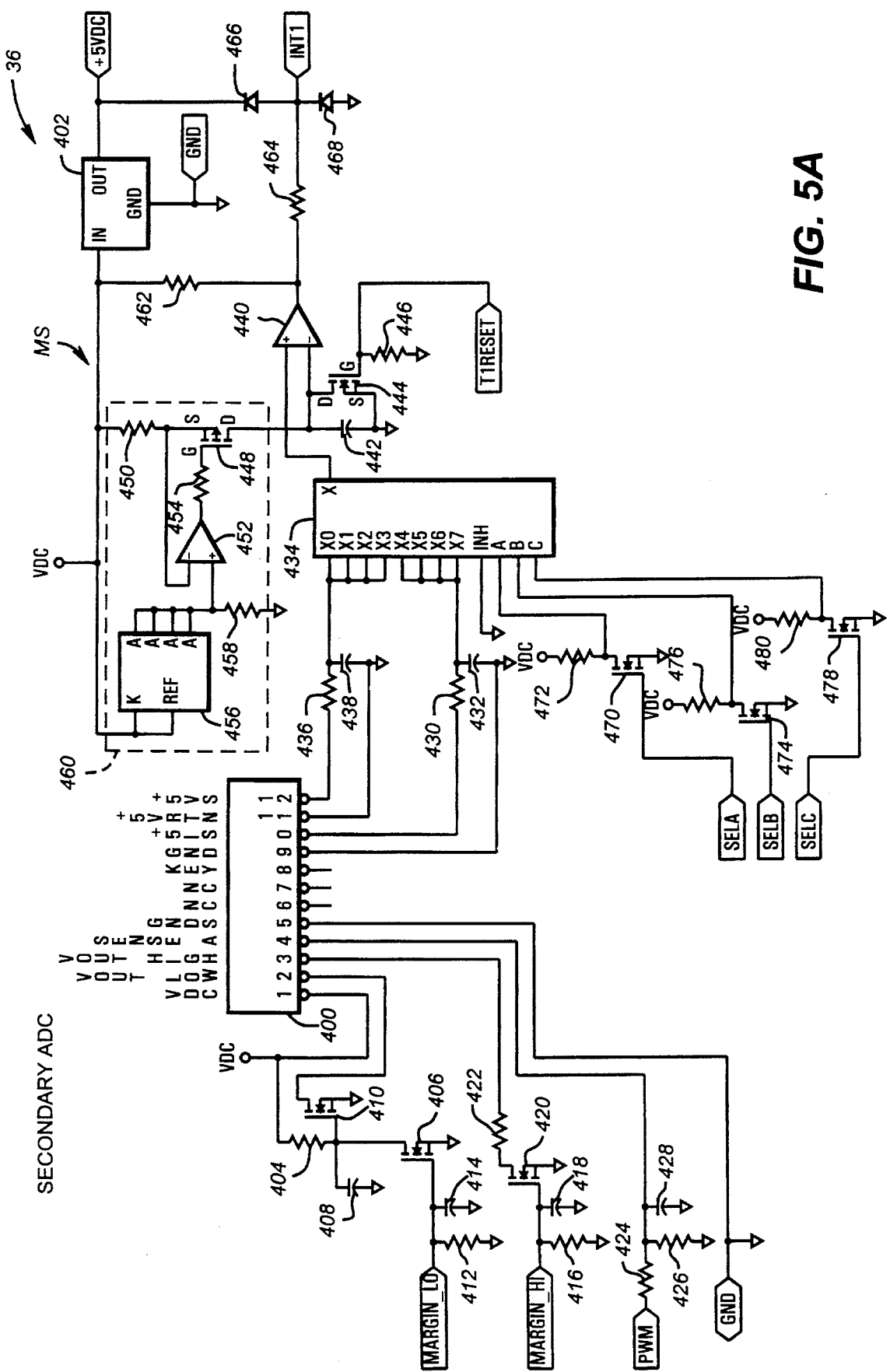
FIG. 5A is a schematic diagram of the secondary analog to digital conversion circuit of FIG. 1.

Referring now to FIG. 5A, a schematic diagram of the secondary ADC circuit 36 of the power supply monitoring and control circuit 22 of the present invention is shown. The secondary ADC circuit 36 is preferably coupled to the power supply 20 through a 12 pin connector 400. Pin 1 of the connector 400 is connected to the VDC signal of the power supply 20. The VDC signal is connected to the input of a 5 volt regulator 402 which is preferably a MC78M05 5 volt linear voltage regulator. The GND terminal of the voltage regulator 402 is connected to ground, and an output terminal of the voltage regulator 402 provides the +5VDC signal.

The VDC signal is also connected to one side of a pull-up resistor 404 and the other side of the resistor 404 is connected to the drain terminal of a an n-channel enhancement MOSFET 406. The source of the MOSFET 406 is connected to ground and its drain terminal is also connected to one side of a filter capacitor 408 and to the gate terminal of another n-channel enhancement MOSFET 410. The source terminal of the MOSFET 410 and the other side of the capacitor 408 are connected to ground. The drain terminal of the MOSFET 410 is connected to pin 2 of the connector 400 which is also connected to the VOUT LOW signal. The MARGIN_LO signal is connected to the drain terminal of the MOSFET 406 and to one side of a filter resistor 412 and to one side of a filter capacitor 414. The other sides of the resistor 412 and the capacitor 414 are connected to ground.

The MARGIN_HI signal is connected to one side of a resistor 416, to one side of a capacitor 418 and to the gate terminal of an n-channel enhancement MOSFET 420. The other side of the resistor 416, the other side of the capacitor 418 and the source terminal of the MOSFET 420 are connected to ground. The drain terminal of the MOSFET 420 is connected to one side of a resistor 422 and the other side of the resistor 422 is connected to pin 3 of the connector 400. The VOUT HIGH signal is also connected to pin 3 of the connector 400.

The PWM signal is connected to one side of a resistor 424 and the other side of the resistor 424 is connected to one side of a resistor 426, to one side of a capacitor 428 and also to pin 4 of the connector 400. The other side of the resistor 426 and the other side of the capacitor 428 are connected to ground. Pin 4 of the connector 400 is connected to the SENSE A signal. Pin 5 of the connector 400 is connected to the GNDS signal which is the secondary ground of the power supply 20.

Pin 9 of the connector 400 is connected to a signal GND which is a ground from the power supply 20, and which is connected to ground. Pin 10 of the connector 400 is connected to the +5IS signal. Preferably, the +5IS signal has a voltage level of 1 volt every 5 amps of output current. The +5IS signal is connected to one side of a resistor 430 and the other side of the resistor 430 is connected to one side of a filter capacitor 432 and to the X4, X5, X6 and X7 inputs of a multiplexer 434. The multiplexer 434 is preferably a CD4051 8 channel analog multiplexer/demultiplexer and operates similarly to the multiplexer 154. The other side of the capacitor 432 is connected to ground. Pin 12 of the connector 400 is connected to the +5VS signal. The +5VS signal is connected to one side of a resistor 436 and the other side of the resistor 436 is connected to one side of a capacitor 438 and to the X0, X1, X2 and X3 inputs of the multiplexer 434. The other side of the capacitor 438 is connected to ground which is also connected to pin 11 of the connector 400. Pin 11 of the connector 400 is connected to a signal referred to as +5VRTN of the power supply 20.

The multiplexer 434 has an inhibit input connected to ground and 3 select input terminals, labelled A, B and C, which are used to select a signal from one of the input terminals X0–X7 of the multiplexer 434 to connect that input to an output terminal X. In this manner, the channel 0–7 corresponds, respectively, to the input terminals X0–X7. The SELA signal is connected to the gate of an n-channel enhancement MOSFET 470 which has its source connected to ground. The drain of the MOSFET 470 is connected to one side of a resistor 472 and to the A input terminal of the multiplexer 434. The SELB signal is connected to the gate of an n-channel enhancement MOSFET 474 which has its source connected to ground. The drain of the MOSFET 474 is connected to one side of a resistor 476 and to the B terminal of the multiplexer 434. The SELC signal is connected to the gate of an n-channel enhancement MOSFET 478 which has its source terminal connected to ground. The drain of the MOSFET 478 is connected to one side of a resistor 480 and to the C terminal of the multiplexer 434. The other side of the resistors 472, 476 and 480 are connected to the VDC signal. The MOSFETS 470, 474 and 480 function as level shifters/inverters so that when the SELA, SELB and SELC signals are asserted high by the microcontroller 300, the A, B and C inputs of the multiplexer 434 are low and vice versa. In this manner, the microcontroller 300 controls the channel of the secondary ADC circuit 36.

The X output of the multiplexer 434 is connected to the non-inverting input of a comparator 440. The inverting input of the comparator 440 is connected to one side of a capacitor 442 and to the drain terminal of an n-channel enhancement MOSFET 444. The source terminal of the MOSFET 444 and the other side of the capacitor 442 are connected to ground. The gate terminal of the MOSFET 444 is connected to the T1RESET signal and to one side of a pull-down resistor 446. The other side of the resistor 446 is connected to ground.

The inverting input of the comparator 440 is also connected to the drain terminal of another n-channel enhancement MOSFET 448 and the source terminal of the MOSFET 448 is connected to one side of a resistor 450 and to the inverting input of an amplifier 452. The output of the amplifier 452 is connected to one side of a resistor 454 and the other side of the resistor 454 is connected to the gate terminal of the MOSFET 448. The other side of the resistor 450 is connected to the VDC signal and also to the reference terminals of a 2.5 voltage reference 456. The voltage reference 456 is preferably a 2.5 volt TL431ACDR manufactured by Texas Instruments, Inc., which operates similarly as the 2.5 voltage reference 176. The anode output terminals of the voltage reference 456 are maintained at 2.5 volts and are connected to one side of a resistor 458 and the other side of the resistor 458 is connected to ground. The anode outputs of the voltage reference 456 are also connected to the non-inverting input of the amplifier 452. The voltage reference 456, the resistors 458, 454 and 450, the amplifier 452 and the MOSFET 448 comprise a constant current source 460 which operates in a similar manner to the constant current source 180.

The output of the comparator 440 is connected to one side of a pull-up resistor 462 and to a resistor 464. The other side of the resistor 462 is connected to the VDC signal and the other side of the resistor 464, referred to as a signal INT1, is connected to the anode of a diode 466 and to the cathode of a diode 468. The cathode of the diode 466 is connected to the +5VDC signal and the anode of the diode 468 is connected to ground. The constant current source 460, the comparator 440 and the capacitor 442 comprise the main components of the measurement circuit MS, which operates in a similar manner to the measurement circuit MP.

The operation of the secondary ADC circuit 36 will now be described. The VOUT LOW and VOUT HIGH signals are connected to a feedback circuit in the power supply 20. The feedback circuit is partially shown in FIG. 5B wherein an output voltage sense signal OV/SENSE is compared to an output voltage reference signal OVREF in a comparator circuit 482 to regulate the output voltage. The details of the comparator circuit 482 are known to those skilled in the art and are omitted for simplicity. The +5VS signal is connected to one side of a resistor 484 and the other side of the resistor 484 is connected to the OV SENSE signal. The VOUT HIGH signal is also connected to the OV SENSE signal. One side of a resistor 486 is connected to the OV SENSE signal and the other side of the resistor 486 is connected to the VOUT LOW signal. One side of a resistor 488 is connected to the VOUT LOW signal and the other side of the resistor 488 is connected to the secondary ground.

The power supply monitoring and control circuit 22 modifies the OV SENSE signal, thereby affecting the output voltage level of the 5 volt output supply of the power supply 20. The resistors 484 and 486 and the voltage of the OVREF signal are chosen so that when the VOUT LOW signal is grounded, thereby grounding the resistor 488, the feedback circuit including the comparator circuit 482 keeps the +5VS signal at 5 volts. When the microcontroller 300 asserts the MARGIN_LO signal high, the MOSFET 406 is turned on which turns off the MOSFET 410, thereby open circuiting the VOUT LOW signal. When the VOUT LOW signal is open circuited, the voltage of the OV SENSE signal increases such that the power supply 20 attempts to lower its output voltage to compensate for the high sense voltage. In this manner, the 5 volt output supply of the power supply 20 will preferably drop to 4.75 volts in response to open circuiting of the VOUT LOW signal. This response can be monitored by the +5VS signal. When the MARGIN_LO signal is low, the VOUT LOW signal is grounded so that the power supply 20 provides the normal output voltage of 5 volts.

The VOUT HIGH signal should normally be left open circuited to provide normal operation of the power supply 20 wherein the 5 volt output provides 5 volts. If the microcontroller 300 asserts the MARGIN_HI signal high, the MOSFET 420 is turned on, thereby placing the resistor 422 in parallel with the resistor 486. This decreases the OV SENSE signal so that the power supply 20 responds by increasing the 5 volt output to a preferable level of about 5.2 volts. Again, this can be monitored by the +5VS signals through the multiplexer 434.

The resistors 424 and 426 divide the voltage provided by the PWM signal by 2 and this signal is filtered by the capacitor 428 providing the SENSE A signal to the power supply 20. The microcontroller 300 provides a square wave signal to the PWM signal having an amplitude of 5 volts and a programmable duty cycle. This signal is divided by the resistor 424 and 426 and averaged by the capacitor 428. In this manner, the resistors 424, 426 and the capacitor 428 operate as a digital to analog converter wherein the voltage at the SENSE A signal is proportional to the duty cycle of the PWM signal and ranges from 0 to 2.5 volts. For example, if the microcontroller 300 provides a PWM signal with a duty cycle of 50%, the SENSE A signal is 1.25 volts. The SENSE A signal in the power supply 20 provides a voltage reference level representing the maximum allowable current at the output of the 5 volt output of the power supply 20.

Figure 5C:
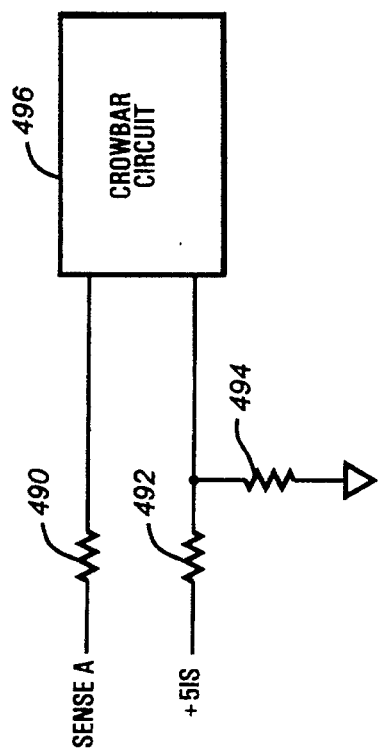
FIGS. 5B and 5C are schematic diagrams illustrating portions of the secondary circuit of the power supply of FIG. 1.
Figure 5B:
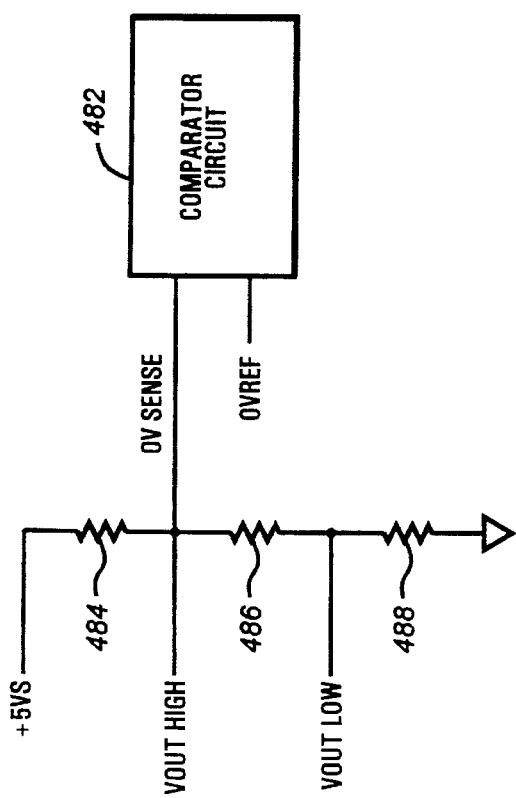

The power supply 20 includes a feedback current loop providing the +5IS signal which has a voltage level proportional to the current being provided at the output of the 5 volt power supply 20. FIG. 5C shows the preferred connection of the +5IS signal and the SENSE A signal to the secondary circuit of the power supply 20. The SENSE A signal is connected to one side of a resistor 490 and the other side of the resistor 490 is connected to one input of a crowbar circuit 496. The +5IS signal is connected to one side of a resistor 492 and the other side of the resistor 492 is connected to one side of a resistor 494 and to a second input of the crowbar circuit 496. The other side of the resistor 494 is connected to the secondary ground. The crowbar circuit 496 includes a comparator circuit so that the +5IS signal is compared to the SENSE A signal. If the +5IS signal becomes equal to twice the SENSE A signal, the comparator switches and the crowbar circuit 496 shuts down the power supply 20. In this manner, the microcontroller 300 can control the current limit of the power supply 20 through the PWM signal. If the PWM signal is set to 0 volts, the power supply 20 is shut down or crowbarred automatically.

The microcontroller 300 selects the channel of the multiplexer 434 to select either the +5IS or the +5VS signal. The selected signal is provided at the output of the multiplexer 434 to the comparator 440. From the previous cycle, the T1RESET signal is set high which turns on the MOSFET 444 and grounds the capacitor 442. When the microcontroller 300 asserts the T1RESET signal low and starts the internal timer TIMER1, the MOSFET 444 is turned off and the constant current source 460 begins to charge the capacitor 442 at a constant rate, which is preferably 178 microseconds per volt. When the voltage across the capacitor 442 rises above the voltage provided at the output of the multiplexer 434, the output of the comparator 444 goes low, thereby asserting the INT1 signal low. The microcontroller 300 is interrupted and runs the secondary interrupt routine and stores the value of the timer TIMER1 in the internal RAM, which represents the voltage level of the selected signal as described previously. Also, when the INT1 signal is pulled low, the T1RESET signal is pulled high, thereby turning on the MOSFET 444, which again grounds the capacitor 442 to reset the INT1 signal high again. Note that although the +5VS and 5IS signals are connected to 4 inputs each of the multiplexer 434, up to 6 other signals could be connected through the multiplexer 434 by another connector similar to the connector 400 from the secondary of the power supply 20 such that the power supply monitoring control circuit 22 of the present invention is not limited to only measuring the voltage levels of the +5IS and +5VS signals.

Figure 6A:
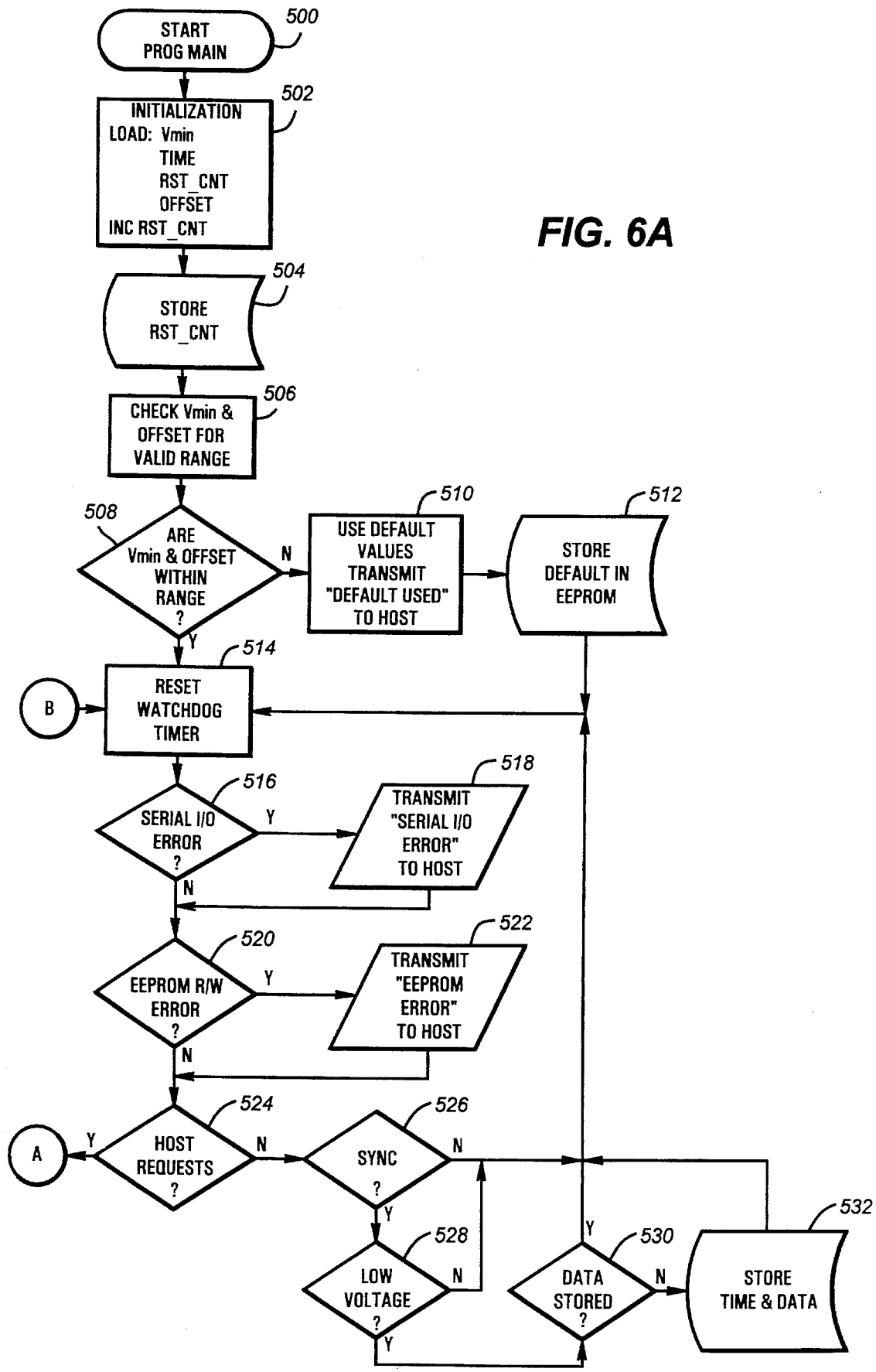
FIGS 6A and 6B are a flow diagram illustrating the operation of a main software program running on the microcontroller of the circuit of FIG. 4.
Figure 6B:
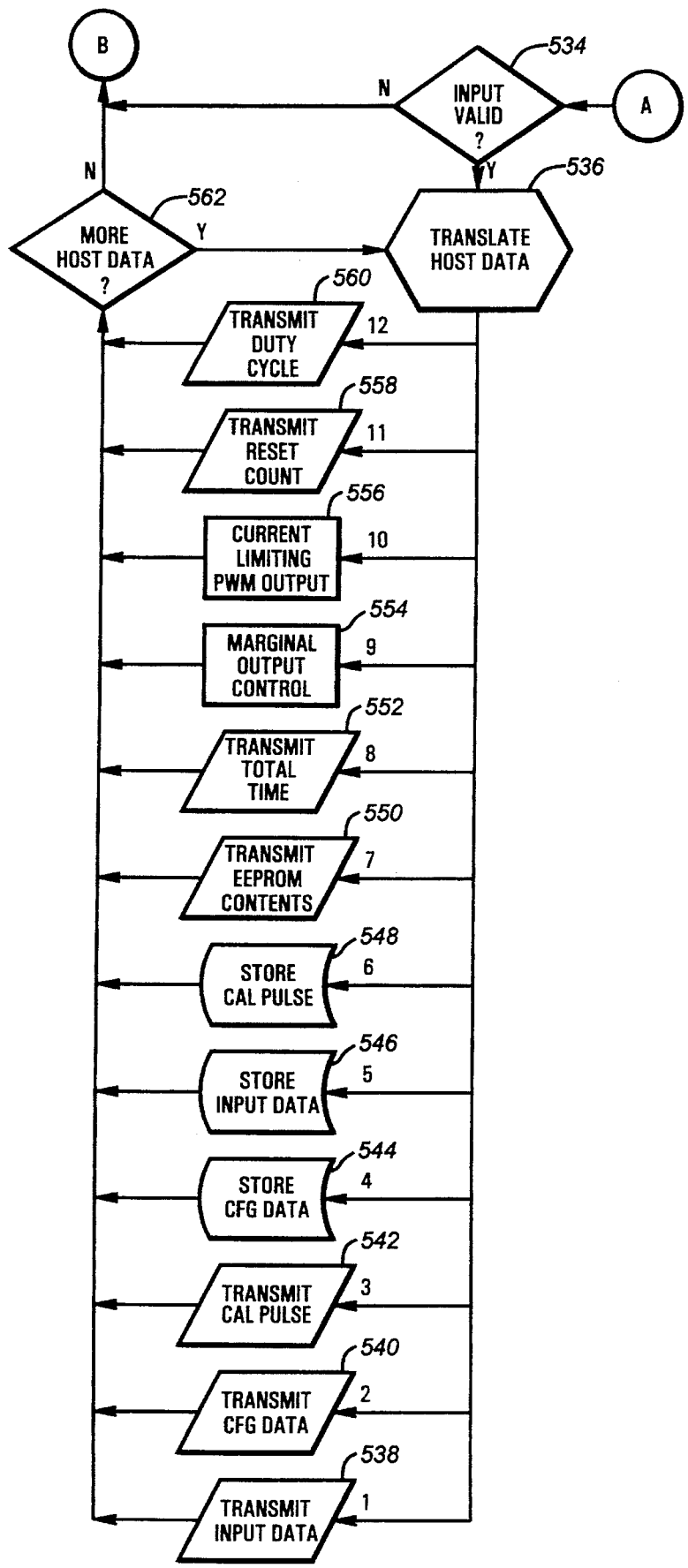
Figure 10A:
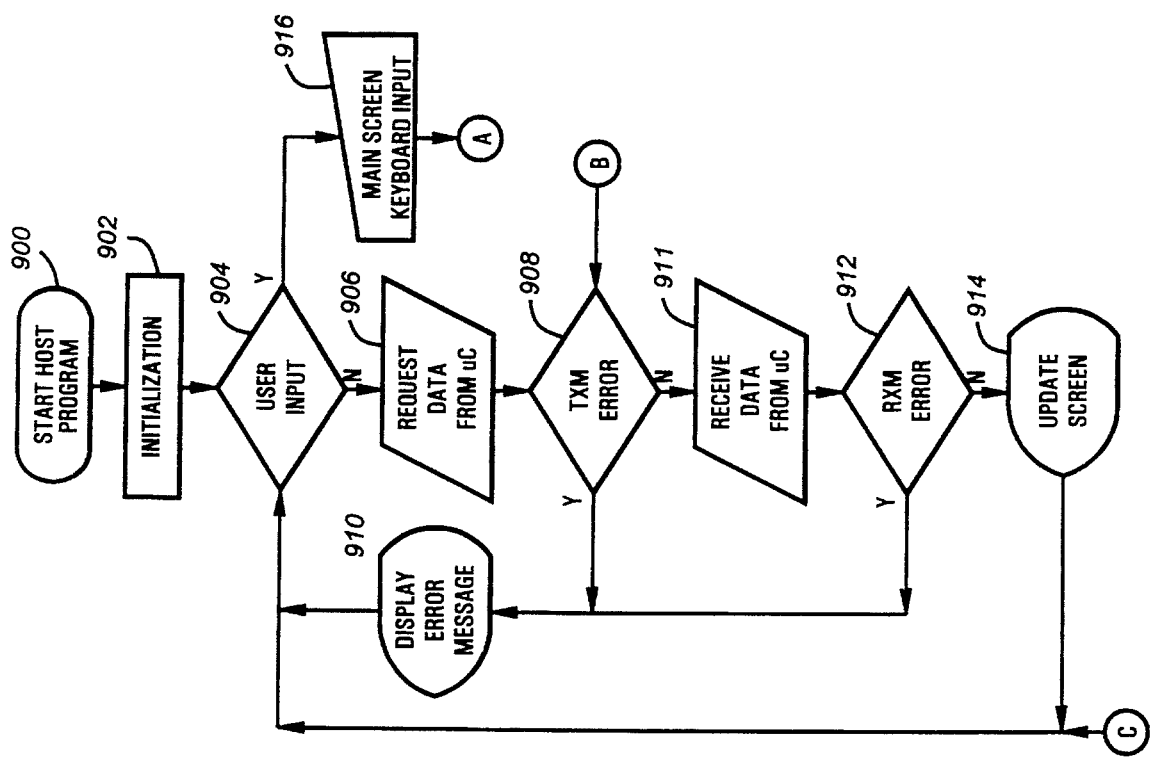

Referring now to FIG. 6, a flow diagram is shown illustrating the sequence of events of a computer program running on the microcontroller 300. It is understood that the computer program as illustrated by the flow diagram of FIGS. 10A and 10B is the preferred method but is not the exclusive software program for the microcontroller 300. A reset step 500 is shown illustrating the beginning point of the flow diagram upon power-up or reset of the microcontroller 300. Upon power-up or reset, the microcontroller 300 begins an initialization routine as illustrated in a step 502. During the initialization program, the microcontroller 300 reads stored parameters from the EEPROM 322 such as the minimum voltage level allowable between the VDC+ and VDC− signals of the power supply 20, referred to as VMIN, the total elapsed time of operation of the power supply 20, or TIME, the total number of times the power supply 20 has been powered up, referred to as RST_CNT, and an offset value referred to as OFFSET which is used for the internal timer TIMER1.

The RST_CNT is incremented by 1 during initialization in the step 502. Operation then proceeds to a step 504, where the microcontroller 300 stores the incremented RST_CNT back into the EEPROM 322. Operation then proceeds to a step 506 where the VMIN and OFFSET parameters are compared to predetermined allowable ranges for the VMIN and the OFFSET parameters. This is necessary to ensure that invalid data is not used. The VMIN and OFFSET parameters are compared to the predetermined ranges as shown by a decision step 508 and if either of these values are not within the predetermined ranges, then operation proceeds to a step 510. If the VMIN and OFFSET parameters are within the predetermined ranges, then operation proceeds to a step 514 described below. In the step 510, default values are used for the VMIN and OFFSET parameters rather than the values read in from the EEPROM 322. A message such as "Default Used" is sent to the host computer 24 on the TXD signal. These default values are then stored back into the EEPROM 322 as shown by a step 512.

Operation then proceeds from the steps 508 or 512 to the step 514 wherein the watchdog timer 304 is reset by a pulse provided on the T0 terminal of the microcontroller 300. The step 514 is the first step in the main loop of the program running on the microcomputer 300 which should be executed within 2 seconds during normal operation.

The computer program running on the microcontroller 300 has three external interrupt routines referred to as the primary interrupt routine, the secondary interrupt routine and the serial I/O interrupt routine which are each initiated, respectively, if the INT0 terminal is asserted low, the INT1 input terminal is asserted low, or if a valid data byte is received at the RXD input terminal of the microcontroller 300. A valid data byte preferably comprises one start bit, eight data bits and one stop bit. If an error occurs in the communications between the microcontroller 300 and the host computer 24, a serial I/O error flag is set within the serial I/O interrupt routine. From the step 514, operation proceeds to a decision step 516, where the serial I/O error flag is monitored. If a serial I/O error has occurred, operation proceeds to a step 518 wherein the microcontroller 300 transmits an error message, which is preferably "SERIAL I/O ERROR," to the host computer 24. If no serial error occurred in the step 516 or after the error message is sent in the step 518, operation proceeds to a decision step 520 which determines if an EEPROM read/write (R/W) error has occurred. If an EEPROM R/W error has occurred, operation proceeds to a step 522 wherein a message is transmitted to the host computer 24, which is preferably "EEPROM ERROR." If no EEPROM R/W error occurred in the step 520 or after the EEPROM ERROR message is transmitted in the step 522, operation proceeds to a decision step 524.

In the decision step 524, a HOST REQUEST flag is checked to determine whether there have been any commands received from the host computer 24 that need to be performed. The HOST REQUEST flag is set in the serial I/O routine described below. If none are to be performed, operation proceeds to a decision step 526, where a flag referred to as SYNC is checked. The SYNC flag is initially cleared and is set within the primary interrupt routine when it is determined that the count of the primary interrupt routine is synchronized with the channel and frame of the primary ADC circuit 32. If the SYNC flag is not set, operation proceeds back to the step 514 and the main loop is repeated. If the SYNC flag is set, operation proceeds to a decision step 528, where the bulk primary DC voltage between the signals VDC+ and VDC− is compared to the predetermined low voltage threshold value as represented by the VMIN parameter. If the primary voltage of the power supply 20 is low, it indicates a possibility of the process of shutdown, wherein certain data values need to be stored in the EEPROM 322 before being lost. This should only be attempted if synchronized with the primary ADC circuit 32 to prevent invalid data from being stored. If the voltage is not low, operation proceeds to the step 514. If a low voltage condition is detected in the step 528, operation proceeds to a step 530 wherein it is determined whether the data has already been stored in the EEPROM 322. If the data has been stored as determined by the decision step 530, operation proceeds to the step 514. Otherwise, operation proceeds to a step 532 wherein the data is stored in the EEPROM 322. The data that is stored during the step of step 532 includes the parameter TIME and the numbers representing measurements of the VMAX, IAVG, +5IS and +5VS signals. Operation then proceeds to the step 514

Referring back to the step 524, if a serial interrupt has occurred and the HOST REQUEST flag is set, then operation proceeds to a decision step 534 where the input command from the host computer 24 is compared to a predetermined set of commands to determine whether the input command is valid. If the command is not valid, operation proceeds to the step 514 and the input is ignored. Otherwise, operation proceeds to a step 536 wherein the command is translated to determine which operation is to be performed by the microcontroller 300. In the preferred embodiment of the present invention, there are 12 commands or operations that the microcontroller 300 can perform as directed by the host computer 24.

The first command is represented by a step 538 where the input data, or the numbers representing measurements of the VMAX, IAVG, +5IS and +5VS signals, are transmitted to the host computer 24 through the TXD signal. A second command is represented by a step 540 which instructs the microcontroller 300 to transmit configuration data, such as the OFFSET and VMIN parameters, to the host computer 24. A third command is represented by a step 542 where the microcontroller 300 transmits the self-calibration data to the host computer 24. The self-calibration data is preferably the value determined from the calibration pulse during a frame 1 of the primary ADC circuit 32. A fourth command as represented by a step 544 instructs the microcontroller 300 to store the configuration data described above in the EEPROM 322. A fifth command as represented by a step 546 instructs the microcontroller 300 to store the input data, described above, into the EEPROM 322. A sixth command as represented by a step 548 instructs the microcontroller 300 to store the self-calibration data in the EEPROM 322. A seventh command as represented by a step 550 instructs the microcontroller 300 to retrieve the contents of the EEPROM 322 and transmit the data to the host computer 24. In the preferred embodiment, an address within the EEPROM 322 is given and the following 22 bytes are transmitted rather than the entire contents.

An eighth command as represented by a step 552 instructs the microcontroller 300 to transmit the TIME parameter to the host computer 24. A ninth command as represented by a step 554 instructs the microcomputer 300 to assert or negate the MARGIN_LO and MARGIN_HI signals to control the operation of the power supply 20. A tenth command as represented by a step 556 instructs the microcontroller 300 to output the PWM signal having a desired duty cycle to set the current limit of the power supply 20. An eleventh command as represented by a step 558 instructs the microcontroller 300 to transmit the RST_CNT parameter to the host computer 24. A twelfth and final command as represented by a step 560 instructs the microcontroller 300 to transmit the duty cycle of the PWM signal to the host computer 24.

Once the microcontroller 300 performs the command as represented by the steps 538–560, operation continues to a decision step 562 wherein the microcontroller 300 determines whether there are any more commands to be performed. If so, operation continues to the translation step 536 and the command is translated and performed. Once all of the commands are performed, operation continues from the step 562 to the step 514 to repeat the main loop of the program.

Referring now to FIG. 7, a flow diagram illustrating the operation of the primary interrupt routine of the computer program running on the microcontroller 300 is shown. A step 600 represents the entry point of the primary interrupt routine wherein operation proceeds to a step 602. In the step 602, the accumulator (ACC) and the process status word (PSW) of the microcontroller 300 are saved and the timer TIMER0 is stopped. Operation then proceeds to a step 604 where the value of the timer TIMER0 is read. Also, a parameter referred to as COUNT is read, where the COUNT parameter is a count-down counter which is analogous to the channel of the counter 162. The parameter COUNT is 0 at the beginning of each frame corresponding to the SYNC or the calibration pulse. The count parameter is then set at the number 8 and decremented before the beginning of each channel, where a COUNT of 7–2 corresponds to the channels 1–6 representing measurements of the VMAX signal. A COUNT of 1 corresponds to the channel 7 representing a measurement of the IAVG signal. The SYNC pulse is used to synchronize the COUNT parameter with the channels and frames of the primary ADC circuit 32. Since the primary ADC circuit 32 operates asynchronously and independently of the microcontroller 300, it is likely that initially the COUNT parameter and the channel of the primary ADC circuit 32 do not correspond properly. It may take several frames or iterations of the primary interrupt routine before the COUNT parameter is synchronized with the channel. The primary function of the primary interrupt routine is to read the timer TIMER0, restart the timer TIMER0 and to synchronize the COUNT parameter with the channel of the primary ADC circuit 32.

Once the timer TIMER0 and the COUNT parameter have been read, operation proceeds to a step 606 wherein the timer TIMER0 is preset with a number corresponding to the software overhead minus the dead time delay of the primary ADC circuit 32. The preset value is preferably chosen to correlate the timer TIMER0 with the point in time that the RESET signal is asserted low. In the step 606, the COUNT is also decremented. The COUNT is initially set to a 1 upon power-up so that after it is decremented in the step 606, it should be 0 during the first iteration of the primary interrupt routine. Operation proceeds to a decision step 608 which determines whether the COUNT parameter is 0. If COUNT is not 0, operation continues to a step 610 wherein the COUNT is checked to see if it is equal to 1. If the COUNT is equal to 1, it is assumed that a measurement of IAVG has occurred if the operation synchronized. Thus, if COUNT equals 1 in the step 610, operation continues to a step 612 wherein the value from the timer TIMER0 representing the measurement of the level of the IAVG signal is converted to current and stored in the internal RAM of the microcontroller 300. Operation then continues to a step 614, where the ACC and PSW parameters are restored, and then to a step 616 representing a return command wherein control is returned to the main program of the microcontroller 300 at the point of the interruption.

If the COUNT equals 0 in the step 608, operation proceeds to a decision step 618 where it is determined whether a SYNC pulse has occurred. A SYNC pulse is assumed to have occurred if the pulse width was less than or equal to 40 microseconds. If a SYNC pulse has been detected, then operation continues to a step 620, where a parameter LAST FRAME is set equal to 0 since a frame 0 is occurring since a SYNC pulse has been detected. The parameter LAST FRAME is used in the next iteration of the primary interrupt routine so that it is known whether the last frame was a frame 0 or a frame 1. Operation then continues to a step 622 wherein the COUNT parameter is set equal to 8 and the SYNC flag is set indicating that a SYNC pulse has occurred and that operation is synchronized. Operation then continues to the step 614 to return to the main program as described above.

In the step 618, if a SYNC pulse has not been detected, then operation continues to a decision step 624 to query the LAST FRAME parameter to determine whether the last frame was a frame 0 or a frame 1. If the LAST FRAME parameter is equal to 0, then it is assumed that the last frame was a frame 0 and that a frame 1 is occurring, where operation continues to a step 626. In the step 626, the value of the timer TIMER0 is assumed to represent a calibration pulse and is stored in the internal RAM of the microcontroller 300. Operation then proceeds to a step 628 wherein the LAST FRAME parameter is set equal to 1 since it is assumed that a frame 1 has just occurred. Operation then proceeds to the step 622 where the COUNT parameter is set equal to 8 and the SYNC flag is set.

Referring back to the decision step 624, if the LAST FRAME parameter is not equal to 0, then operation proceeds to a step 630 wherein it is determined that the COUNT parameter is not synchronized with the channel of the primary ADC circuit 32. Recall that if the COUNT is 0 as determined in the step 608, and a SYNC pulse has not occurred, then the last frame should have been a frame 0 since a calibration pulse has just been detected such that the current frame should be a frame 1. Since only one frame 1 should occur once at a time, only a frame 0 should follow a frame 1. If this is not the case, then the COUNT parameter is incremented and the SYNC flag is cleared in the step 630 so that the COUNT parameter will be decremented to 0 in the next channel or iteration. During each subsequent iteration, operation flows from the step 608 to the step 630 until a SYNC pulse is detected to synchronize the COUNT with the channel. Operation proceeds from the step 630 to the step 614 to return to the main program.

Referring back to the step 610, if the COUNT is not equal to 1, then operation proceeds to a decision step 632 to determine whether a SYNC pulse is detected. Recall that if the COUNT is not equal to 0 and if it is not equal 1, then the pulse should be greater than the width of a SYNC pulse if the system is synchronized. If a SYNC pulse is not detected in the step 632, then operation continues to a step 634 wherein it is assumed that the pulse represents a measurement of the VMAX signal. In the step 634, the pulse width time is translated to a voltage value and stored in the internal RAM and operation then continues to the step 614 to return to the main program. If in the step 632 a SYNC pulse is detected, then the system is not synchronized and operation continues to a step 636 wherein the COUNT parameter is incremented and the SYNC flag is cleared. The step 636 indicates that the system is not synchronized so that the COUNT parameter is incremented in order to retry the pulse in the next iteration of the primary interrupt routine. From the step 636, operation continues to the step 614 to exit the primary interrupt routine and return to the main program.

Figure 8:
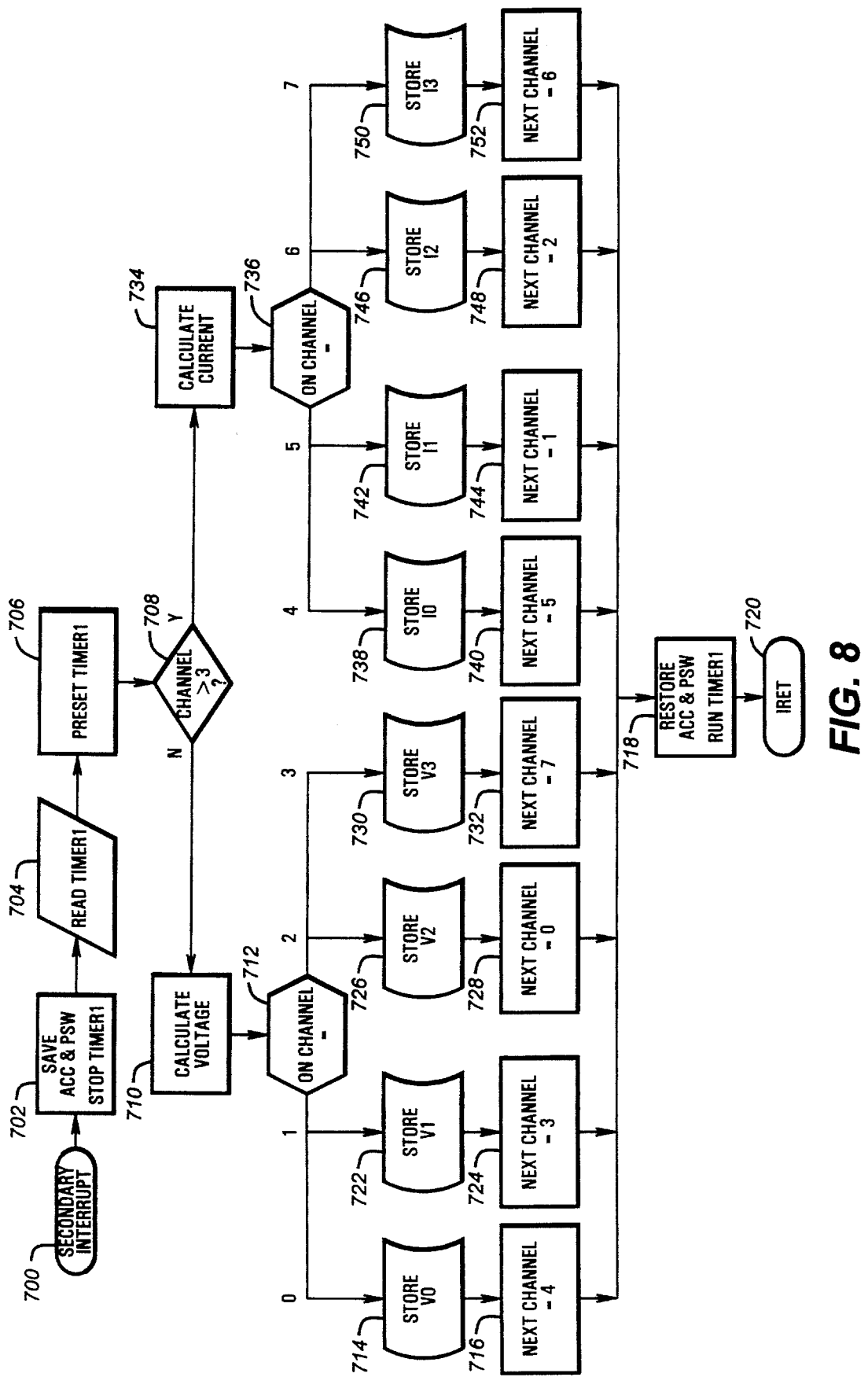
FIG. 8 is a flow diagram illustrating a secondary interrupt routine of a software program running on the microcontroller of the circuit of FIG. 4.

Referring now to FIG. 8, a flow diagram illustrating the operation of the secondary interrupt routine is shown. Operation begins at a start step 700 when the INT1 terminal of the microcontroller 300 is asserted low. Operation proceeds to a step 702 wherein the ACC and PSW parameters are saved as described previously. The second timer TIMER1 is stopped and operation continues to a step 704 wherein the content of the TIMER1 is read and stored in the internal RAM. Operation then proceeds to a step 706, where the timer TIMER1 is preset with the parameter OFFSET.

Operation continues from the step 706 to a decision step 708 wherein the channel of the secondary ADC circuit 36 is monitored. If the channel of the secondary ADC circuit 36 is 0-3, then the measurement is the voltage of the +5VS signal in the preferred embodiment. Otherwise, if the channel is from 4-7, then the measurement is the voltage of the +5IS signal. In the step 708, if the channel is between 0-3, operation continues to a step 710 wherein the number of the timer TIMER1 is read in the step 704 is converted to a number representing a voltage. From the step 710, operation proceeds to a multiple output path step 712 wherein the succeeding operation depends upon the channel.

If the channel is equal to 0, then operation proceeds to a step 714 where the voltage is stored in the internal RAM of the microcontroller 300 as a voltage V0 and then to a step 716 where the next channel is set equal to 4. If the channel is equal to 1, then operation proceeds to a step 722 where the voltage is stored in the RAM as a voltage V1 and then to the step 724 where the next channel is set equal to 3. If the channel is 2 in the step 712, operation proceeds to a step 726 where the voltage is stored as a voltage V2 and then to a step 728 where the next channel is set equal to 0. If the channel is 3, operation continues to step 730 where the voltage is stored as a voltage V3 and then to a step 732 where the next channel is made equal to 7. In the preferred embodiment, the voltages V0, V1, V2 and V3 all represent the same voltage of the +5VS signal. It is understood, however, that the secondary interrupt routine and the secondary ADC circuit 36 could handle up to four different voltages V0–V3 rather than just the +5VS signal.

If in the step 708, the channel is greater than 3, then operation continues to a step 734 where the number from the timer TIMER1 is converted to a value representing current. From the step 734, operation proceeds to a multiple output path step 736 where if the channel is equal to 4, operation proceeds to a step 738 where the current value is stored as a current I0 and then to a step 740 where the next channel is set equal to 5. If the channel was equal to 5 in the step 736, operation continues to a step 742 where the current is stored as a current I1 and then to a step 744 where the next channel is set equal to 1. If the channel in step 736 is equal to 6, operation proceeds to a step 746 where the current value is stored as a current I2 and then to a step 748 where the next channel is set equal to 2. Finally, if the channel is equal to 7 in the step 736, operation proceeds to a step 750 where the current value is stored as a current I3 and then operation proceeds to a step 752 where the next channel is set equal to 6. It is noted that the secondary interrupt routine and the secondary ADC circuit 36 are capable of measuring up to four different currents I0–I3 rather than just the +5IS signal.

From the steps 716, 724, 728, 732, 740, 744, 748 and 752, operation proceeds to a step 718 wherein the ACC and the ASW parameters are restored. Also, in the step 718, the timer TIMER1 is started and the microcontroller 300 asserts the P1.2 terminal high to begin another measurement cycle of the secondary ADC circuit 36. Operation then proceeds to a step 720 to return to the main program at the point of interruption. Also note that the channel switching sequence is: 0, 4, 5, 1, 3, 7, 6, 2 wherein the measurements alternate from voltage to current and then from a current to a voltage during each consecutive pair of interrupt iterations. In this manner, a voltage may correspond to a certain current and only one of the SELA, SELB and SELC signals must be changed at a time to reduce software overhead.

Figure 9:
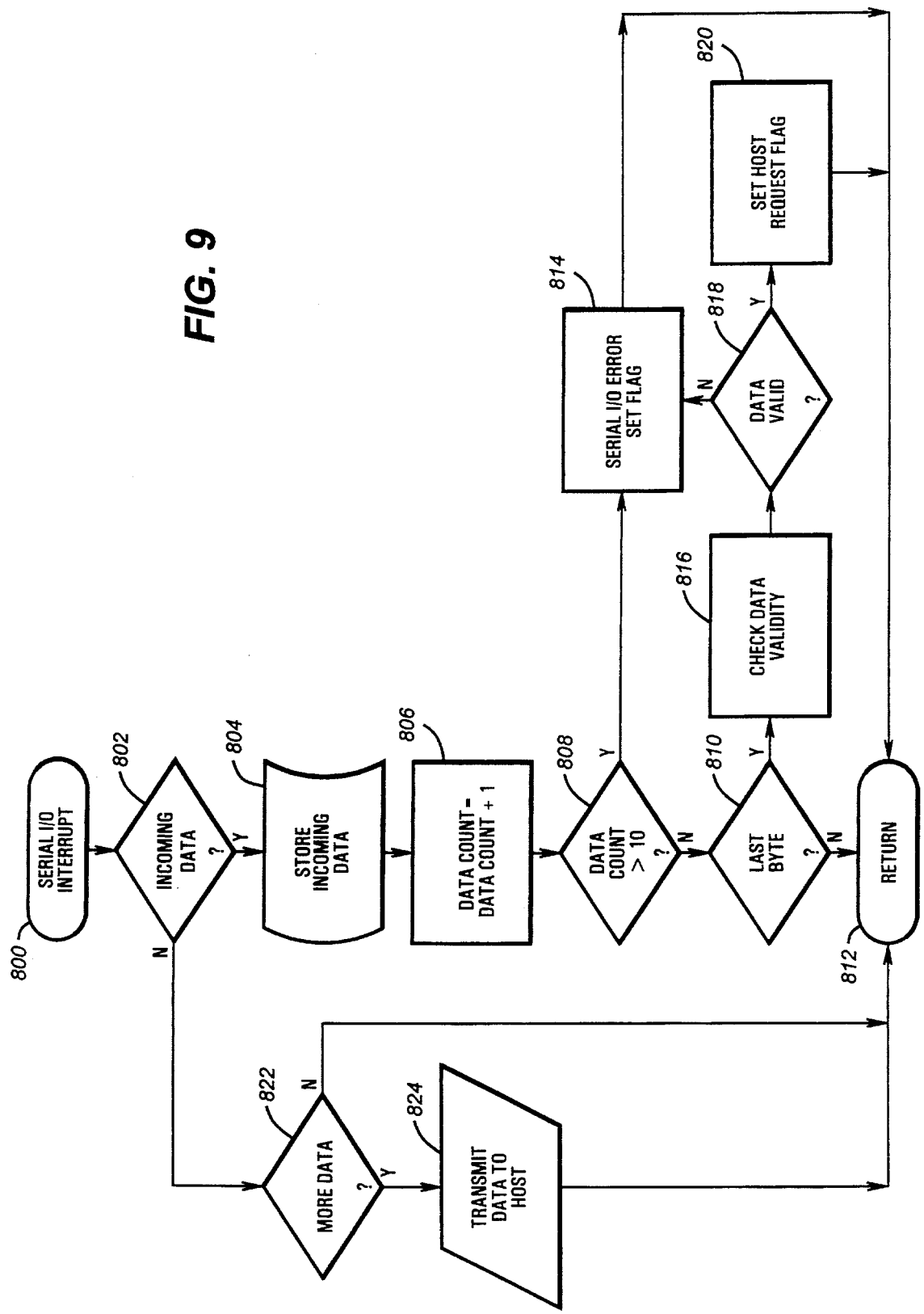
FIG. 9 is a flow diagram illustrating a serial input/output interrupt routine of a software program running on the microcontroller of the circuit of FIG. 4.

Referring now to FIG. 9, a flow diagram illustrating the operation of the serial I/O interrupt routine is shown. The internal UART of the microcontroller 300 preferably receives a start bit followed by a byte of data and terminated by a stop bit from the RXD signal. The UART then interrupts the microcontroller 300 to execute the serial I/O interrupt routine. Also, the UART interrupts the microcontroller 300 if data needs to be sent to the host computer 24 after a stop bit is sent via the TXD signal. A step 800 indicates the starting point of the serial I/O interrupt routine and operation begins at a decision step 802 where the direction of the data flow of the serial communications is determined. If data is coming from the host computer 24 to the microcontroller 300 in step 802, operation continues to a step 804 where the command is stored in the internal RAM of the microcontroller 300. Operation then proceeds to a step 806 where a parameter referred to as DATA COUNT is incremented to maintain an on-going count of the commands that are received from the host computer 24. Operation then proceeds to a decision step 808 where the DATA COUNT parameter is compared to 10. If the DATA COUNT is less than or equal to 10, operation proceeds to a decision step 810 which determines whether the current byte received was the last byte from the host computer 24. The host computer 24 preferably sends a stop byte indicating that the last byte was sent. If it is not the last byte, operation continues to a step 812 where operation is returned to the main program.

In the step 808, if the DATA COUNT is greater than 10, an error has occurred since the DATA COUNT should preferably not be greater than 10, wherein operation proceeds to a step 814 and the serial I/O error flag is set. This is the same error flag which is monitored in the step 516 of the main program of the microcontroller 300. From the step 814, operation proceeds to a step 812 to exit the serial I/O interrupt routine. From the step 810, if a last byte is received, operation proceeds to a step 816 wherein the data from the host computer 24 is checked for validity, such as a check sum or parity error. Operation then proceeds to a decision step 818 where if the data is not valid, operation proceeds to the step 814 where the serial I/O error flag is set. If, on the other hand, the data is valid, operation proceeds to a step 820 where the HOST REQUEST flag is set. From the step 820, operation is returned to the main program through the step 812.

Referring back to the step 802, if a serial interrupt has occurred and the data is not incoming from the host computer 24, then the microcontroller 300 is sending data to the host computer 24 such that operation proceeds to a decision step 822. In the decision step 822, if more data is to be sent to the host computer 24, then operation proceeds to a step 824 wherein the next byte of data is transmitted to the host computer 24. Operation is then returned to the main program of the microcontroller 300 through the step 812. If no more data is to be transmitted to the host computer 24 as determined in the step 822, then operation is directly returned to the main program through the step 812.

The operation of the microcontroller 300 will now be briefly summarized. The main program running on the microcontroller 300 first initializes, and then performs four basic functions. The main program constantly resets the watchdog timer 304, monitors I/O errors between the microcontroller 300 and the host computer 24 as well as the EEPROM 322, retrieves, translates and performs commands from the host computer 24, and detects a power down situation to store data in the EEPROM 322 before the data is lost. The microcontroller 300 can manipulate the operation of the power supply 20 pursuant to several of the commands retrieved from the host computer 24. The main program is temporarily interrupted by one of three interrupt routines. The primary interrupt routine retrieves and stores measured values from the primary side of the power supply 20. The secondary interrupt routine retrieves and stores data from the secondary of the power supply 20. The serial I/O interrupt routine retrieves commands from and sends data and responses to the host computer 24.

Referring now to FIGS. 10A and 10B, a flow diagram illustrating the operation of a computer program running on the host computer 24 is shown. Although many variations of a computer program may be implemented, the program illustrated in FIG. 11 is the preferred embodiment for operation in conjunction with the main program running on the microcontroller 300. In general, the host computer program operates to establish a user interface between an operator and the power supply monitoring and control circuit 22 of the present invention. The primary functions of the host program are to send commands to and request data from the power supply monitoring and control circuit 22, and to store the data to a data storage disk of the host computer 24. A step 900 represents the start point of the host program wherein operation begins in a step 902 which is an initialization routine executed upon power-up or upon execution of the host computer program. The initialization program may preferably include operations such as opening the serial communication port between the microcontroller 300 and the host computer 24 through the connector 336 and to print a display screen for user input.

From the step 902, operation proceeds to a decision step 904 where it is determined whether the user has requested input. In the step 904, if there is no user input, operation proceeds to a step 906 where a command is sent to request data, such as the values representing the VMAX, IAVG, +5VS and +5IS signals, from the microcontroller 300. Once any request for data from the microcontroller 300 is made, operation continues to a decision step 908 where it is determined whether a transmission error of data through the serial interface to the microcontroller 300 from the host computer 24 has occurred. If an error has occurred, operation proceeds to a step 910 where an error message is displayed on the computer screen of the host computer 24 to the user. If a transmission error has not occurred in the step 908, operation proceeds to a step 911 where data is received through the serial port interface from the microcontroller 300. Operation then proceeds to another decision step 912 which is similar to the decision step 908, where if a transmission error has occurred in receiving the requested data, operation proceeds to the step 910 to display the error message to the user, and then operation proceeds to the step 904. If a receive error, or an error in transmission from the microcontroller 300, has not occurred in the step 912, operation proceeds to a step 914 where the screen of the host computer 24 is updated to reflect the new data received from the microcontroller 300. Operation then proceeds from the step 914 back to the step 904 to repeat the loop.

Referring again to the step 904, if there is user input, operation proceeds to the input step 916 which receives the user input, and then operation proceeds to a multiple output step 918 where the input is translated to one of a plurality of possible inputs by the user. If the user requests self-test data, preferably indicated by an "S", such as the calibration pulse width, then operation proceeds to a step 920 where a request is made to the microcontroller 300 for the self-test data, and operation proceeds to the step 908 to send the command. If the user requests the values of the TIME and RST_CNT parameters, which is preferably indicated by a letter "T", operation proceeds to a step 922 where a request for the TIME and the RST_CNT is made and operation proceeds to the step 908.

If the user wishes to request data from or store data to the EEPROM 322, as represented by the letter "E", operation continues to an input step 924, where the user is prompted to select from one of four options represented by the letters "O", "C", "D" and "T". The user input is translated in a step 926 where operation continues to a step 928 if the user requests the value of the OFFSET parameter, which is represented by the letter "O". If the user requests the EEPROM 322 contents as represented by the letter "C", operation proceeds to a step 930. Note that the request for the EEPROM 322 contents as represented by a step 930, corresponds to the step 550 of FIG. 6B. Operation then proceeds to the step 908. If the user commands to store data in the EEPROM 322 as represented by the letter "D" operation proceeds from the step 926 to the step 932 wherein a command is sent to the microcontroller 300 to store data in the EEPROM 322, and then operation proceeds to the step 904 for more user input. Finally, if the user commands to store self data in the EEPROM 322 as represented by the letter "T", operation proceeds to a step 934 and the microcontroller 300 is commanded to store the self data in the EEPROM 322 and operation proceeds to the step 904.

Referring back to the translation step 918, if the user wishes to store the input data, which is the same input data referred to in the step 538 (FIG. 6B), directly into a disk system on the host computer 24, as represented by the letter "D", operation continues from the step 918 to a step 936 wherein data is directly stored into the disk on the host computer 24. Operation then proceeds to the step 904. If the user wishes to control the operation of the power supply 20 through the power supply monitoring and control circuit 22, as represented by a user input "C", operation proceeds to a step 938 which prompts the user to input one of three commands "O", "C" or "B". Operation then proceeds to a step 940 where the command is translated. If the user wishes to control the marginal output voltage of the power supply 20 as represented by the letter "O", operation proceeds to a step 942 where the user can set the MARGIN_HI and the MARGIN_LO signals. If the user wishes to alter the current limit on the power supply 20 to a new value, as represented by the input "C", operation proceeds to a step 944, where the current limiting value is set. If the user wishes to shut down the power supply, as represented by an input B, the operation proceeds to a step 946, where the power supply is shut down by setting the voltage of the PWM signal to 0. After any of the steps 942, 944 or 946, operation then proceeds to the step 904 for further user input.

Finally, referring back to the step 918, if the user wishes to calculate the calibration data and store the calibration data in the EEPROM 322, as represented by an input "A" or "B", operation proceeds to a step 948 where certain offsets and threshold voltages such as the VMIN and VMAX signals and the OFFSET parameter are retrieved from the user from a user keyboard. The offsets and threshold voltage values from the user are calculated in a step 950 and this data is then transmitted to the microcontroller 300 and stored in the EEPROM 322 as represented by a step 952. Operation then proceeds to the step 904 for further user input.

It can now be appreciated that the power supply monitoring and control circuit 22 of the present invention provides a way to retrieve valuable diagnostic and status information from a power supply as well as control the operation of the power supply. The preferred embodiment, as disclosed herein, constantly retrieves data from the primary and secondary circuits of the power supply 20 through the INT0 and INT1 signals, respectively. The operation of the power supply 20 is controlled through the MARGIN_HI, MARGIN_LO and PWM signals. Maintenance logging is performed by the power supply monitoring and control circuit 22, such as the number of times the power supply 20 is powered-up as well as the total elapsed time of operation. Further, the host computer 24 communicates with the power supply monitoring and control circuit 22 through a serial communications port so that the host computer 24 can monitor and control the power supply 20 from a remote location. Thus, the host computer 24 can be part of a separate system located in a remote or central location, yet the user or operator can perform maintenance logging, off-site monitoring, and diagnostics as well as control the power supply 20 remotely.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. A system for monitoring power supply parameters, the system comprising:

a power supply receiving an input voltage and current and providing an output voltage and current;

means connected to said power supply for developing analog signals representative of said input voltage and current and output voltage and current;

means connected to said means for developing analog signals for converting said analog signals to digital values;

a microcontroller connected to said analog to digital converting means for calculating voltage and current values from said digital values, said microcontroller including a serial port;

a host computer system having a serial port, said host computer system serial port connected to said microcontroller serial port to allow communication between said microcontroller and said host computer system, said host computer system including means for requesting voltage and current values from said microcontroller; and wherein said microcontroller includes means responsive to said host computer system requests for providing voltage and current values to said host computer system.

2. The system of claim 1, wherein said power supply includes a primary side portion receiving said input voltage and current and a secondary side portion providing said output voltage and current, said primary side portion including means for developing a DC voltage proportional to said input voltage; and wherein said means for developing analog signals develops said analog signal representative of said input voltage from said primary side portion DC voltage.

3. The system of claim 2, wherein said means for developing analog signals includes a multiplexer having a plurality of inputs and an output, and said analog signals representative of said input voltage and current are provided as inputs to said multiplexer.

4. The system of claim 3, wherein said means for developing analog signals further includes a voltage reference means providing a reference signal, said reference signal being provided as an input to said multiplexer.

5. The system of claim 3, wherein said means for developing analog signals further includes means connected to said multiplexer for selecting which of said multiplexer inputs are connected to said multiplexer output.

6. The system of claim 5, wherein said multiplexer input selecting means sequentially selects said multiplexer inputs.

7. The system of claim 5, wherein said analog to digital converting means receives said multiplexer output signal and converts said multiplexer output signal to a digital signal having a pulse length proportional to the level of said multiplexer output signal.

8. The system of claim 7, wherein said analog to digital converting means periodically provides a digital signal having a pulse length of approximately a predetermined time for synchronization.

9. The system of claim 8, wherein said predetermined pulse length digital signal is provided in replacement of a specific one of said multiplexer inputs.

10. The system of claim 9, wherein said microcontroller includes means for timing the pulse length of said digital signal to provide a time value, and means to convert said time value to a respective current or voltage value.

11. The system of claim 10, wherein said microcontroller includes means to determine if said pulse length is approximately said predetermined time to allow synchronization and means for synchronizing calculation of said current and voltage values with the selection of current and voltage signals to said multiplexer output.

12. The system of claim 7, wherein said analog to digital converting means includes a comparator having inputs, a capacitor connected to one input of said comparator, and a constant current source connected to said capacitor, said multiplexer output signal connected to another input of said comparator.

13. The system of claim 12, wherein said analog to digital converting means further includes means connected to said capacitor to discharge said capacitor and to allow said capacitor to be charged to commence a pulse of said digital signal.

14. The system of claim 7, wherein said microcontroller includes means for timing the pulse length of said digital signal to provide a time value, and means to convert said time value to a respective current or voltage value.

15. The system of claim 3, wherein said microcontroller includes output signals representative of a desired multiplexer input and wherein said output signals are coupled to said multiplexer to select which of said multiplexer inputs are connected to said multiplexer output.

16. The system of claim 15, wherein said microcontroller includes means to sequentially change said output signals representative of a desired multiplexer input.

17. The system of claim 15, wherein said analog to digital converting means receives said multiplexer output signal and converts said multiplexer output signal to a digital signal having a pulse length proportional to the level of said multiplexer output signal.

18. The system of claim 17, wherein said analog to digital converting means includes a comparator having inputs, a capacitor connected to one input of said comparator, and a constant current source connected to said capacitor, said multiplexer output signal connected to another input of said comparator.

19. The system of claim 18, wherein said analog to digital converting means further includes means connected to said capacitor to discharge said capacitor and to allow said capacitor to be charged to commence a pulse of said digital signal.

20. The system of claim 17, wherein said microcontroller includes means for timing the pulse length of said digital signal to provide a time value, and means to convert said time value to a respective current or voltage value.

21. The system of claim 2, wherein said microcontroller is powered by said secondary side portion output voltage and wherein said microcontroller is connected to said means for developing analog signals by use of an optocoupler.

22. The system of claim 1, wherein said power supply includes a feedback input for monitoring said output voltage for regulation purposes;

wherein said microcontroller includes an output signal for altering said power supply output voltage; and said system further comprising:

means connected to said feedback input of the power supply and said microcontroller output signal for altering the level of voltage at said feedback input of the power supply upon receipt of a signal from said microcontroller.

23. The system of claim 20, wherein said microcontroller includes output signals representative of reducing and increasing said power supply output voltage; and wherein said means for altering the level of voltage at said feedback input of the power supply appropriately raises or lowers the level of voltage at said feedback input of the power supply upon receipt of said output signals representative of reducing and increasing said power supply output voltage from said microcontroller.

24. The system of claim 1, wherein said power supply includes an output current limit input and means for ceasing providing of output current when a voltage representative of the output current exceeds a proportion of the voltage present at said output current limit input;

wherein said microcontroller includes an output signal for providing a signal representative of a desired output current limit; and said power supply further comprising:

means connected to said power supply output current limit input and said signal representative of a desired output current limit for altering the level of voltage present at said output current limit input based on said signal representative of a desired output current limit.

25. The system of claim 24, wherein said signal representative of a desired output current limit is a pulse width modulated signal and wherein said means for altering the level of voltage present at said output current limit input converts said pulse width modulated signal to an analog voltage level.

26. The system of claim 1, further comprising:

non-volatile memory coupled to said microcontroller.

27. The system of claim 26, wherein said microcontroller includes means for storing current and voltage values in said non-volatile memory.

28. The system of claim 26, wherein said non-volatile memory includes a value representing the number of times the power supply has been activated; and wherein said microcontroller includes means for incrementing said non-volatile memory activation number upon each activation of the power supply.

29. The system of claim 26, wherein said non-volatile memory includes a value representing the total operating time of the power supply; and wherein said microcontroller includes means for counting real time of operation and for incrementing said total operating time value in said non-volatile memory by said real time of operation prior to powering down of the power supply.

* * * * *

UNITED STATES PATENT AND TRADEMARK OFFICE
CERTIFICATE OF CORRECTION

PATENT NO. : 5,481,730

DATED : JANUARY 2, 1996

INVENTOR(S) : Alan E Brown and David S. Lin

It is certified that error appears in the above-identified patent and that said Letters Patent is hereby corrected as shown below:

Claim 23, column 30, line 44, change "claim 20" to "claim 22".

Signed and Sealed this

Twenty-first Day of May, 1996

Attest:

BRUCE LEHMAN

Attesting Officer

Commissioner of Patents and Trademarks